United States Patent [19]

Ortiz, Jr.

[11] Patent Number: 4,997,250

[45] Date of Patent: Mar. 5, 1991

[54] FIBER OUTPUT COUPLER WITH BEAM SHAPING OPTICS FOR LASER MATERIALS PROCESSING SYSTEM

[75] Inventor: Angel L. Ortiz, Jr., Scotia, N.Y.

[73] Assignee: General Electric Company, Schenectady, N.Y.

[21] Appl. No.: 427,075

[22] Filed: Nov. 17, 1989

[51] Int. Cl.⁵ ..................... G02B 6/36; B23K 26/06
[52] U.S. Cl. .................... 350/96.18; 350/16.10; 350/574; 350/448; 350/469; 219/121.75
[58] Field of Search ............ 350/96.10, 96.15, 96.18, 350/96.20, 96.29, 436, 448, 424, 469, 243, 574, 456, 525; 219/121.61, 121.75, 121.6

[56] References Cited

U.S. PATENT DOCUMENTS

| | | | |
|---|---|---|---|
| 3,419,321 | 12/1968 | Barber et al. | 350/8 |
| 4,275,288 | 6/1981 | Makosch et al. | 219/121 LR |
| 4,564,736 | 1/1986 | Jones et al. | 219/121 L |
| 4,676,586 | 6/1987 | Jones et al. | 350/96.20 |
| 4,681,396 | 7/1987 | Jones | 350/96.18 |
| 4,795,227 | 1/1989 | Chande | 350/96.18 |
| 4,799,755 | 1/1989 | Jones | 350/96.18 |
| 4,812,641 | 3/1989 | Ortiz, Jr. | 219/121.62 |
| 4,838,631 | 6/1989 | Chande et al. | 350/6.6 |
| 4,842,360 | 6/1989 | Caro et al. | 350/96.18 |
| 4,844,574 | 7/1989 | Chande | 350/96.18 |
| 4,868,361 | 9/1989 | Chande et al. | 219/121.62 |

OTHER PUBLICATIONS

"Linear, Annular, and Radial Focusing with Axicons and Applications to Laser Machining", by M. Rioux et al., Applied Optics, vol. 17, No. 10, May 15, 1978.

*Primary Examiner*—Brian Healy
*Attorney, Agent, or Firm*—John S. Beulick; James C. Davis, Jr.; Paul R. Webb, II

[57] ABSTRACT

A coupler apparatus for supporting an output end of an optical fiber is described. In one embodiment, the coupler apparatus includes a first lens for collimating as a first collimated beam a portion of a high power laser beam emitted from the output end of the fiber. The beam, as it is transmitted through the coupler, is expanded and shaped into a materials processing beam portion which is focused onto a workpiece surface.

40 Claims, 20 Drawing Sheets

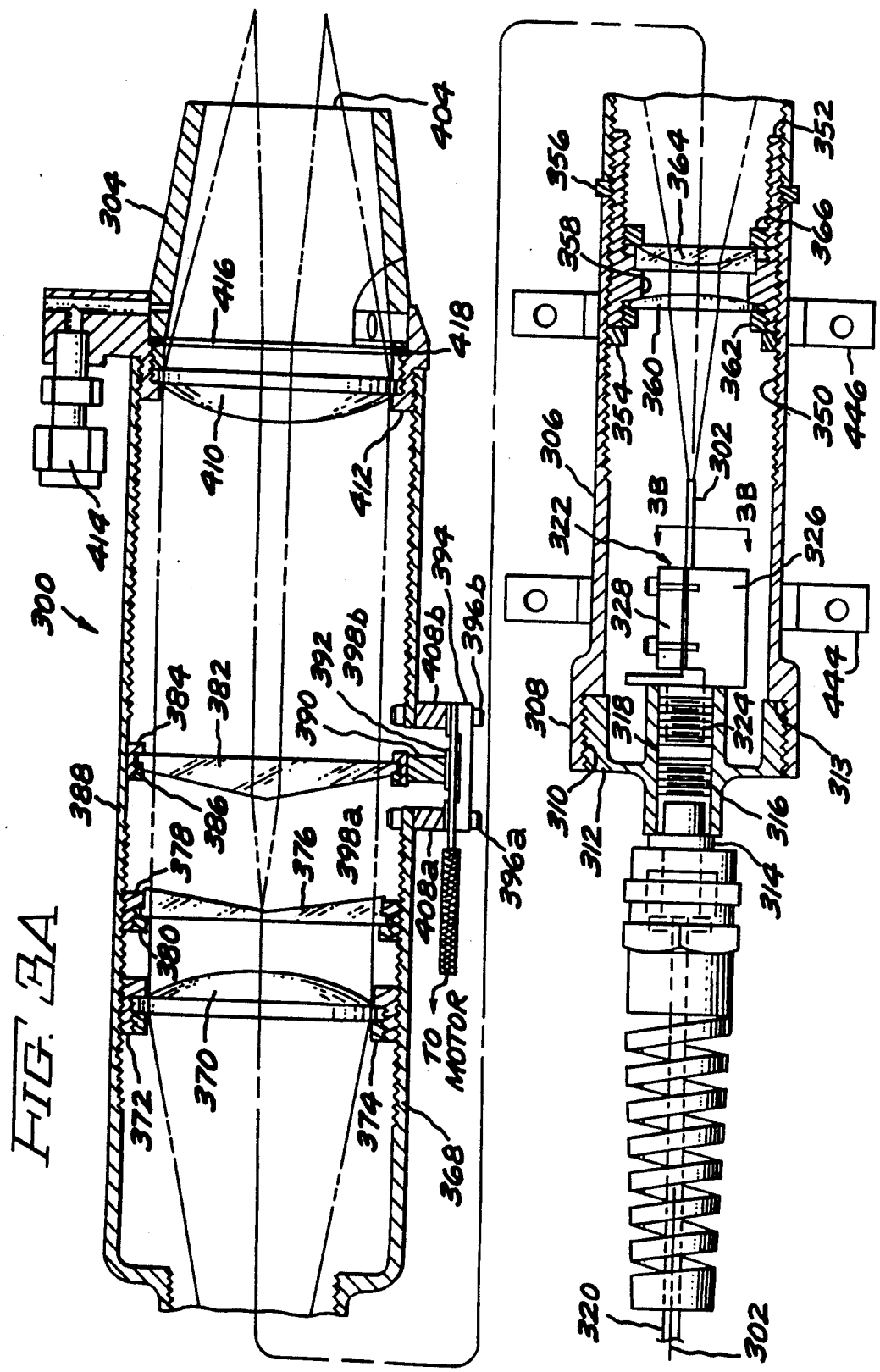

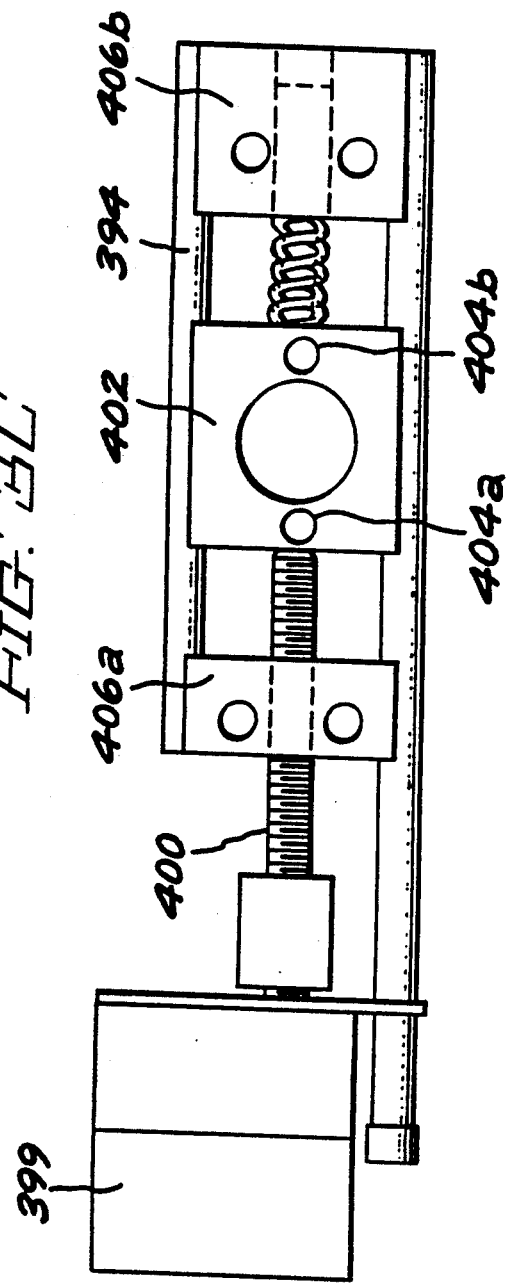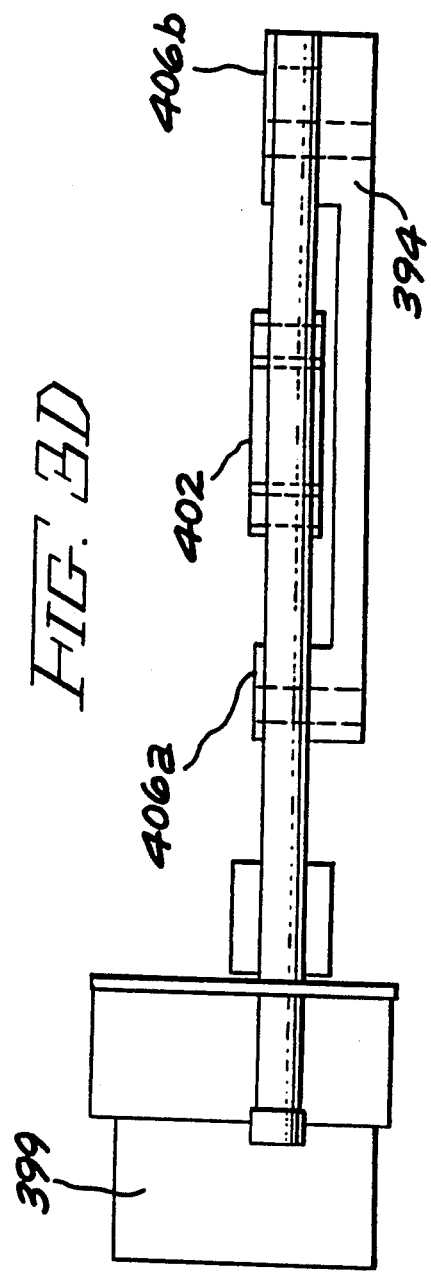

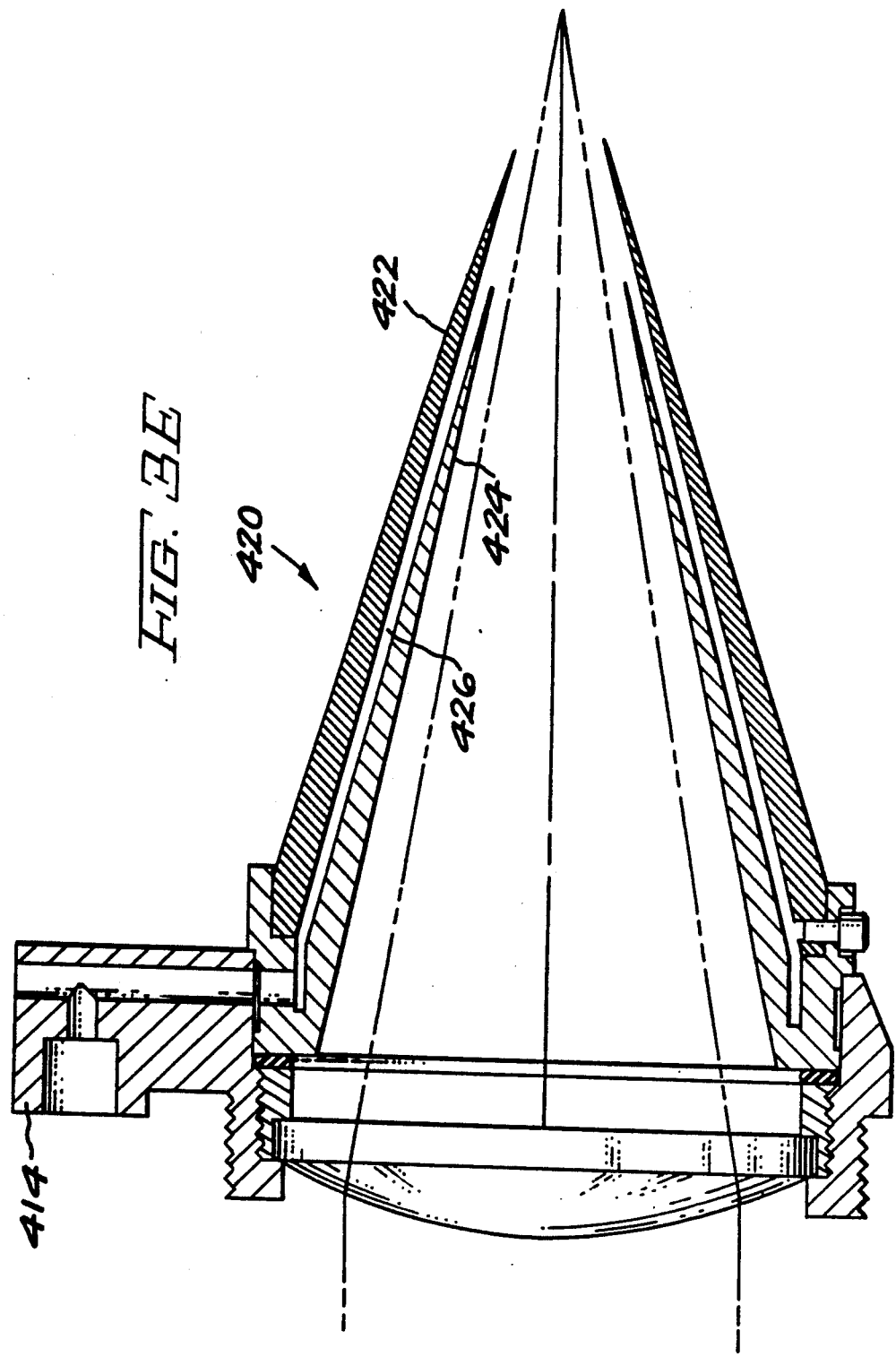

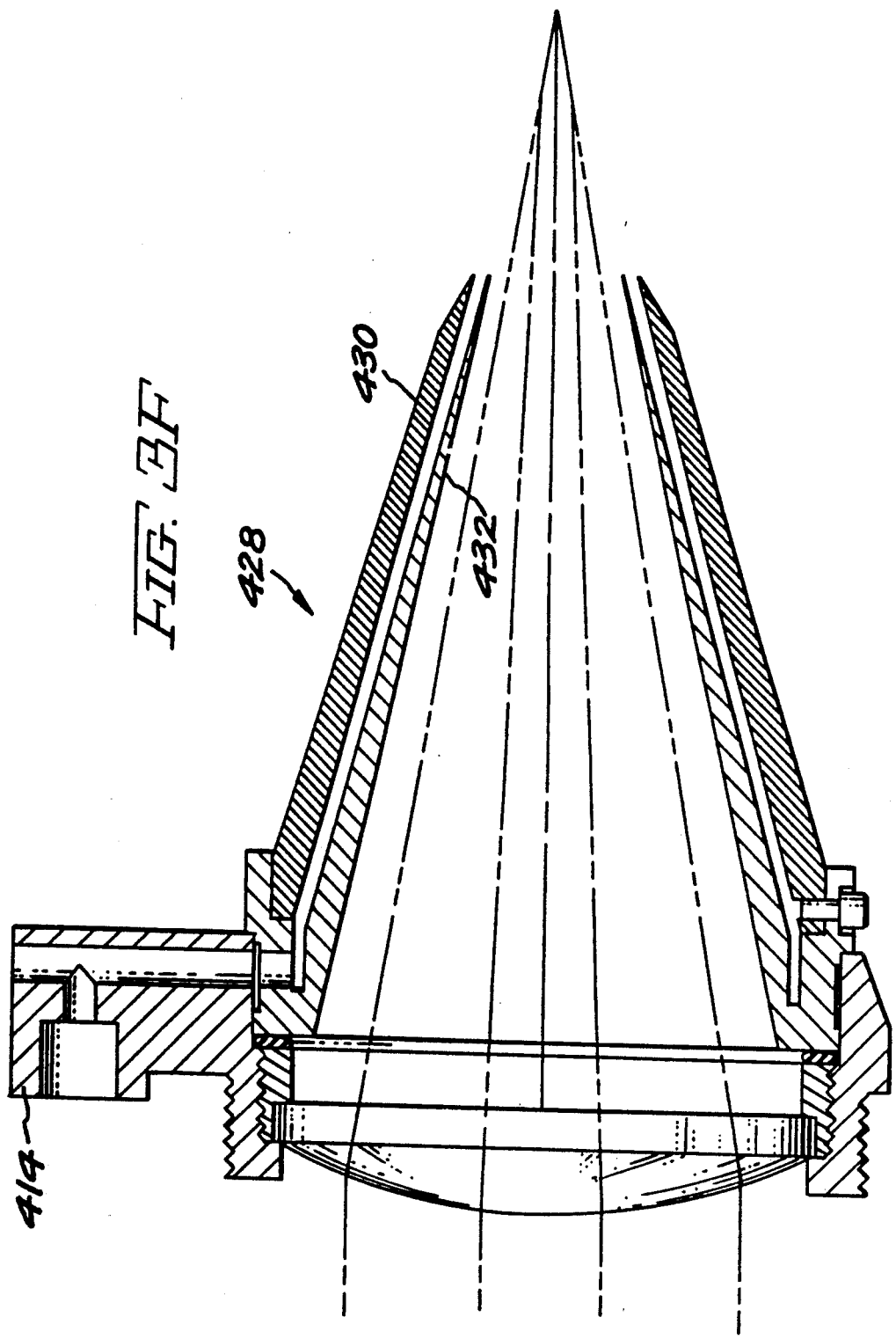

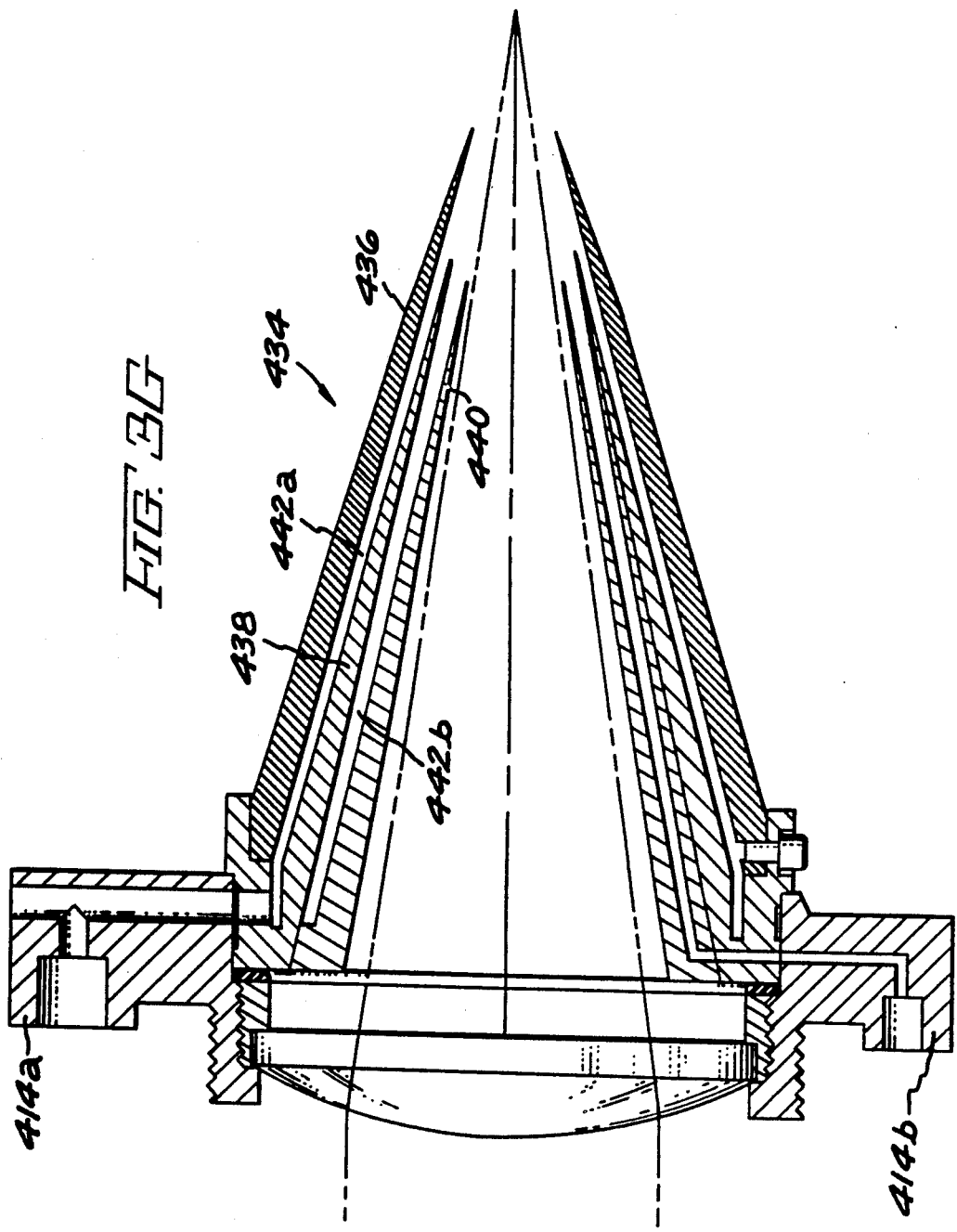

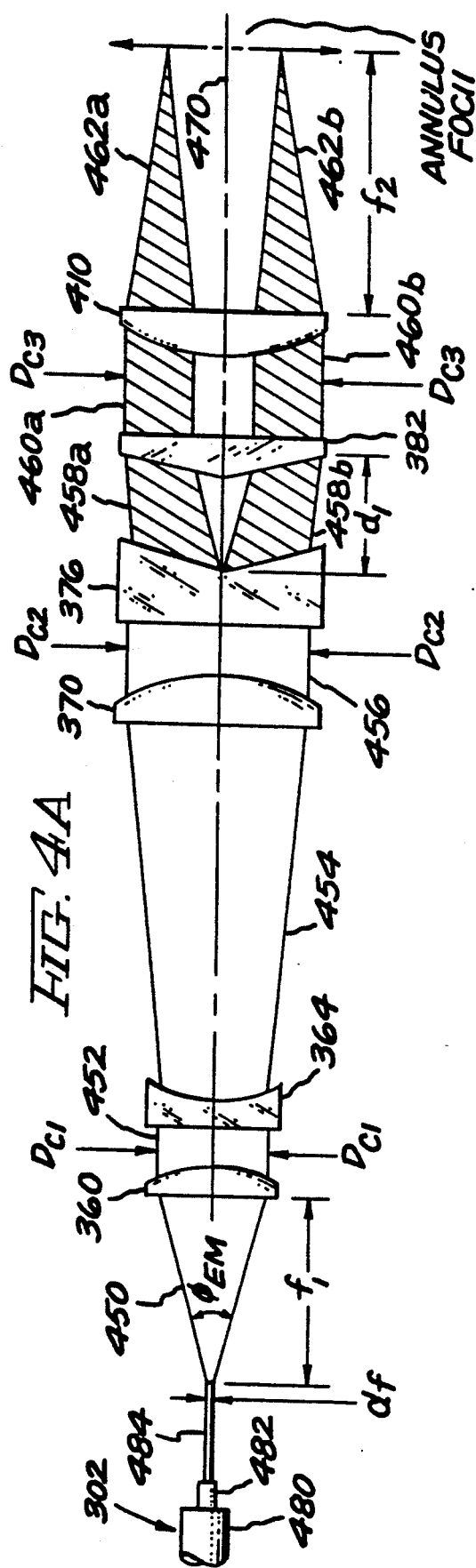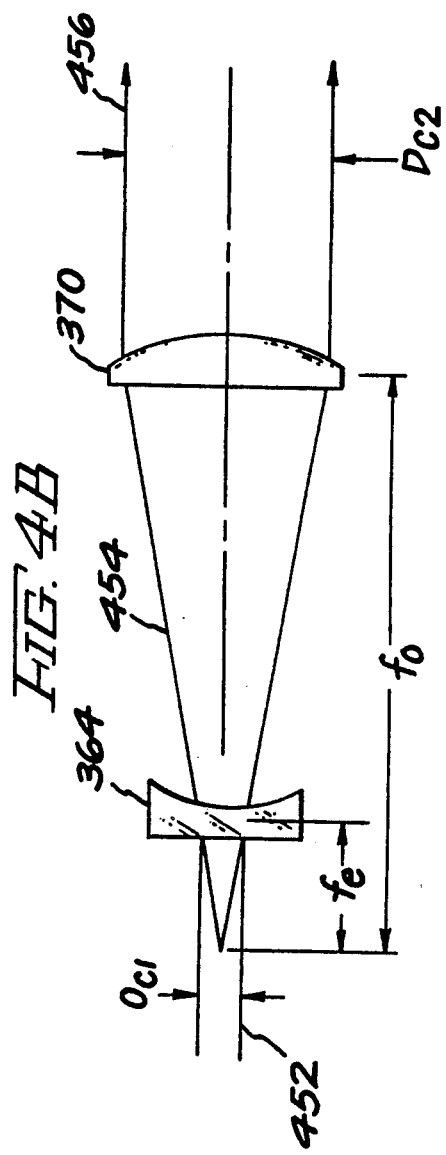

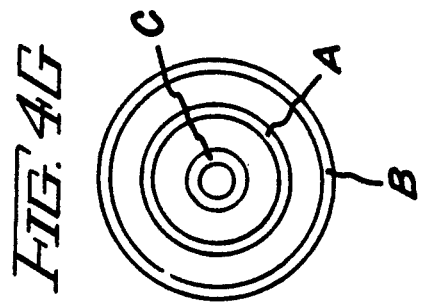
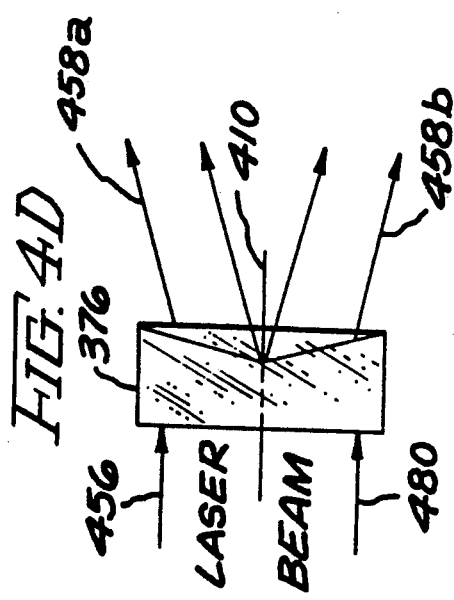
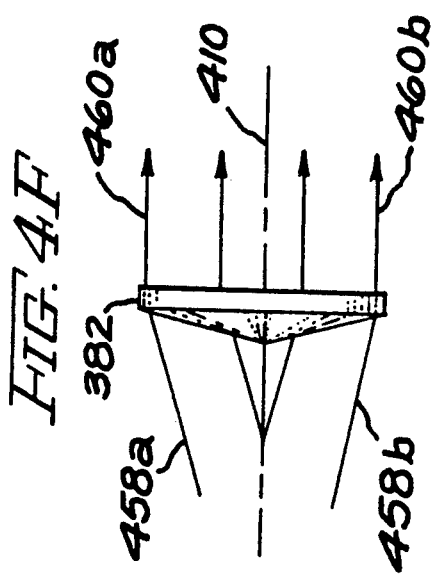
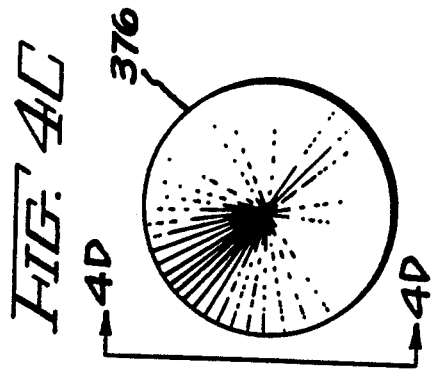
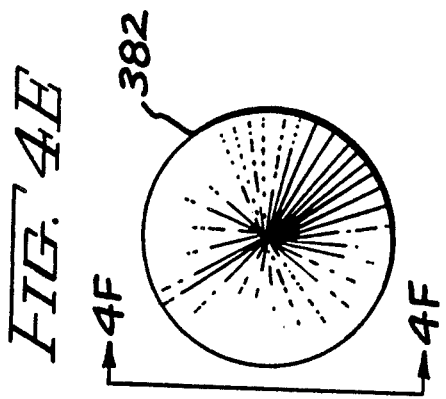

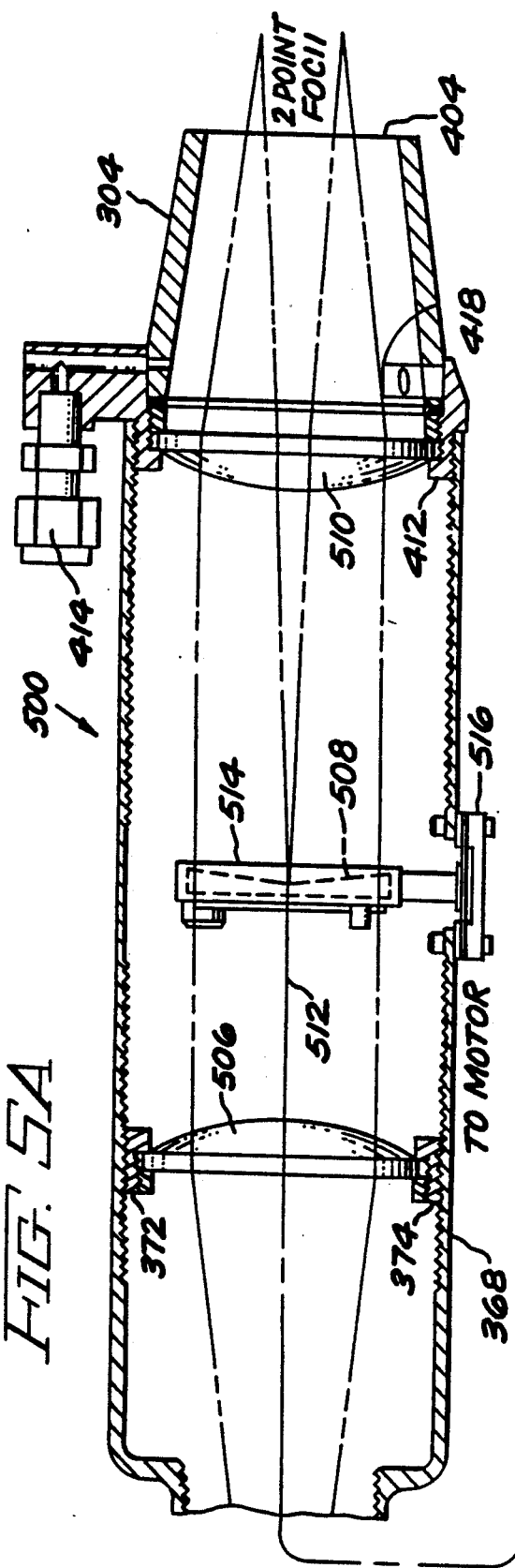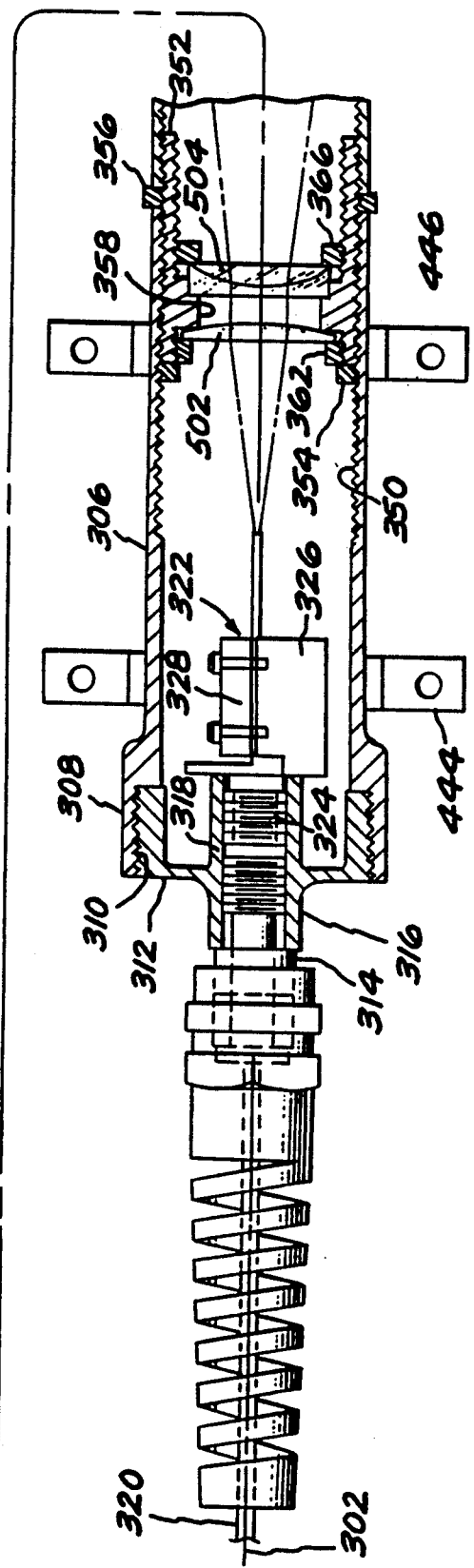
FIG. 5A

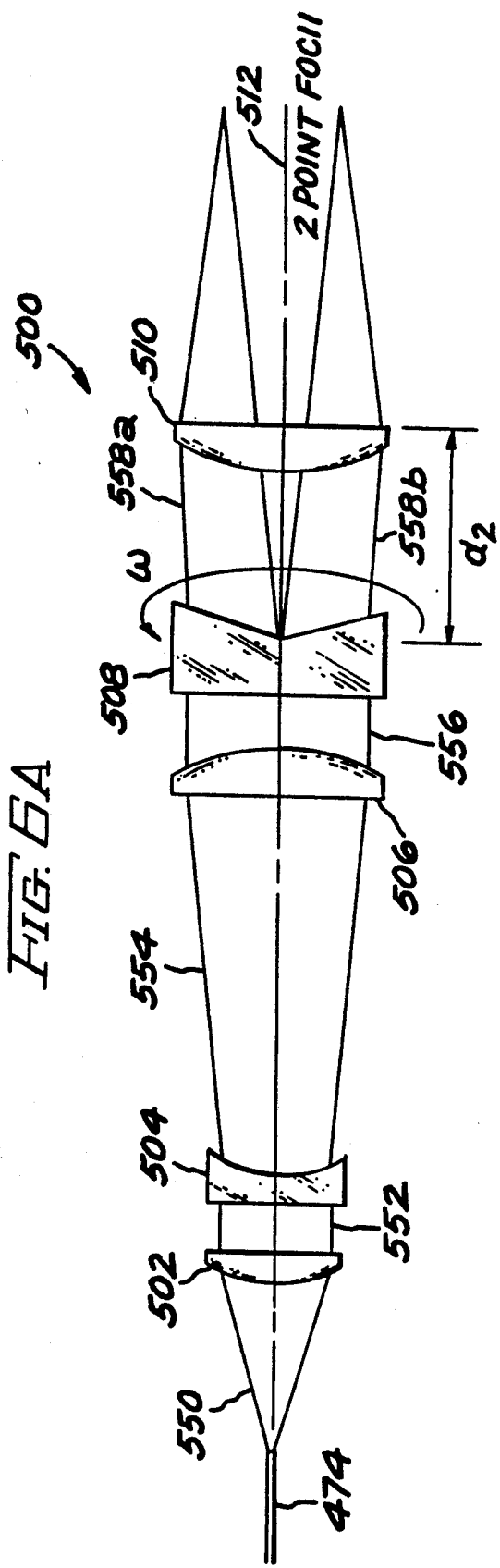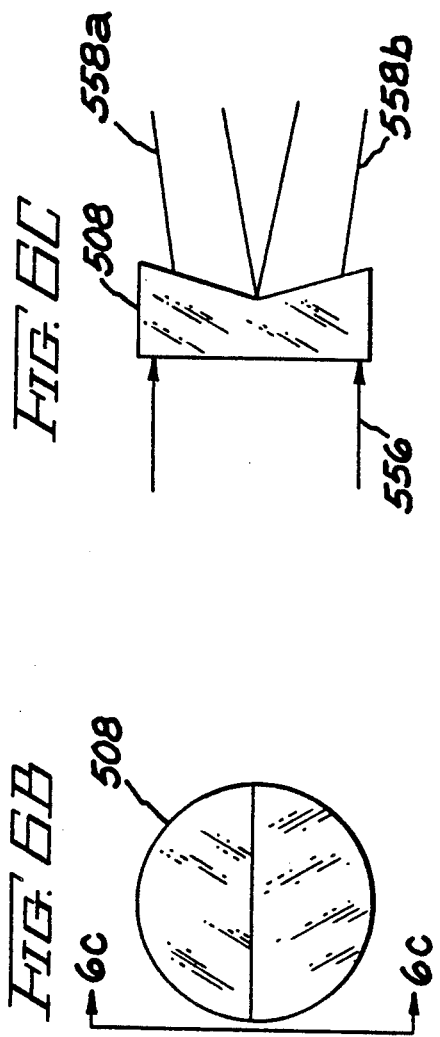

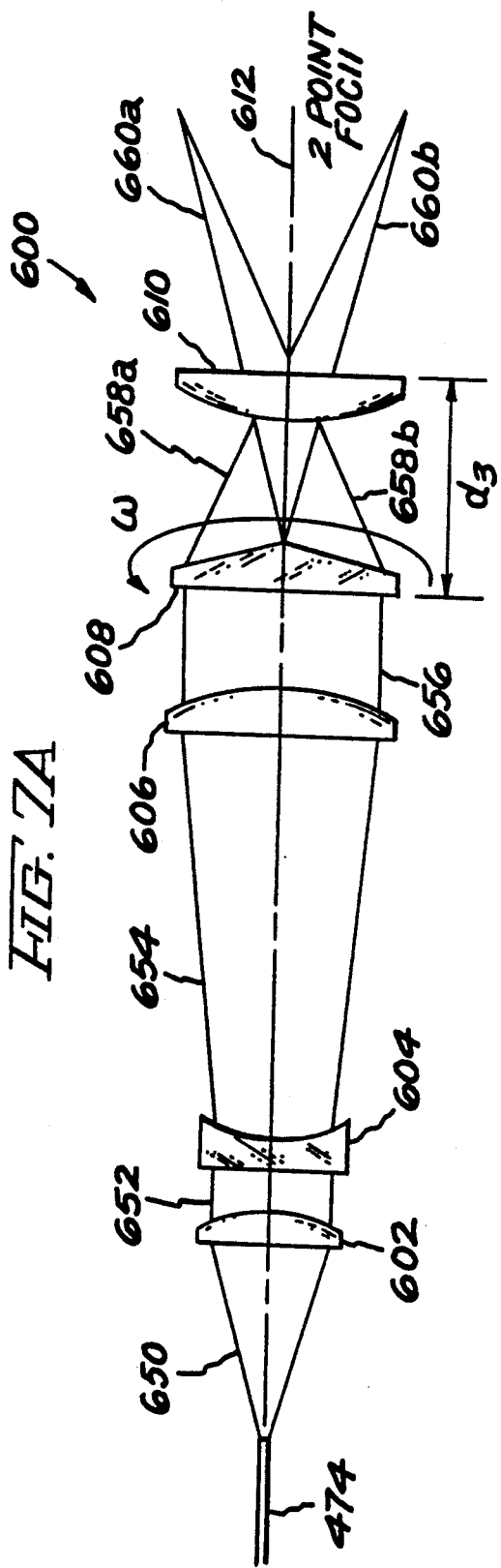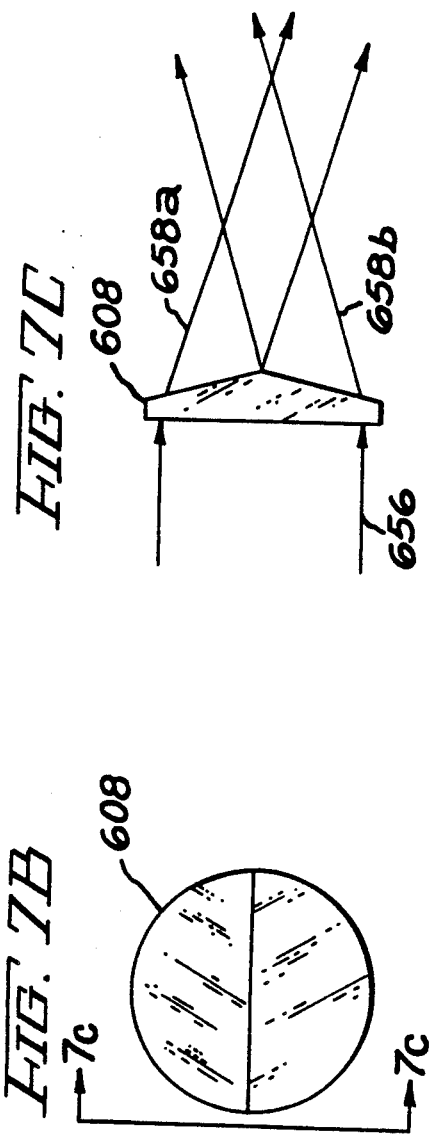

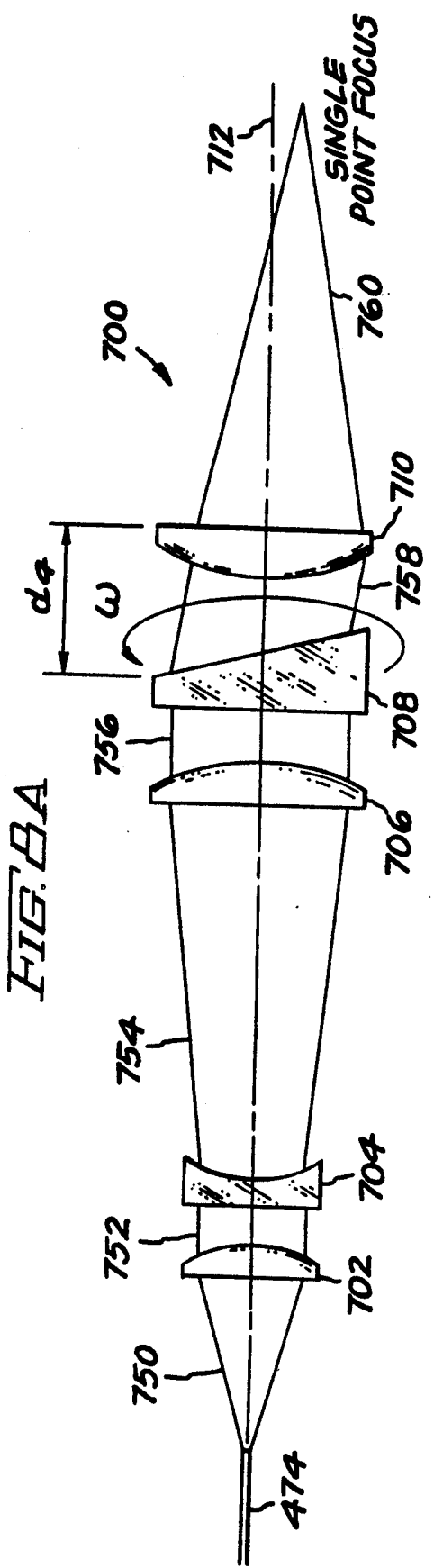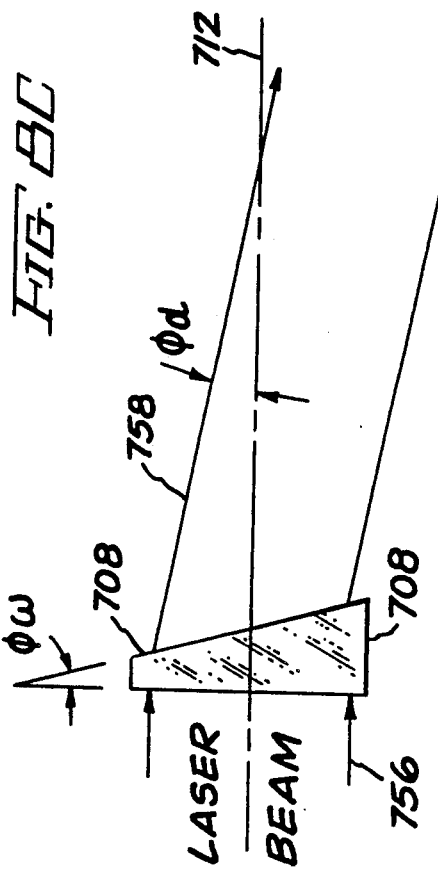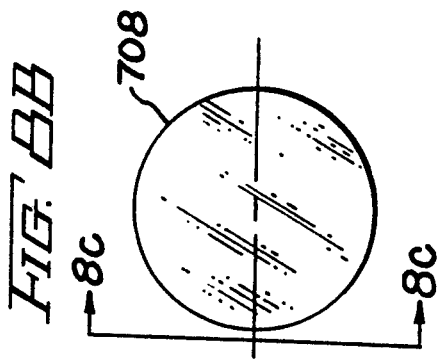

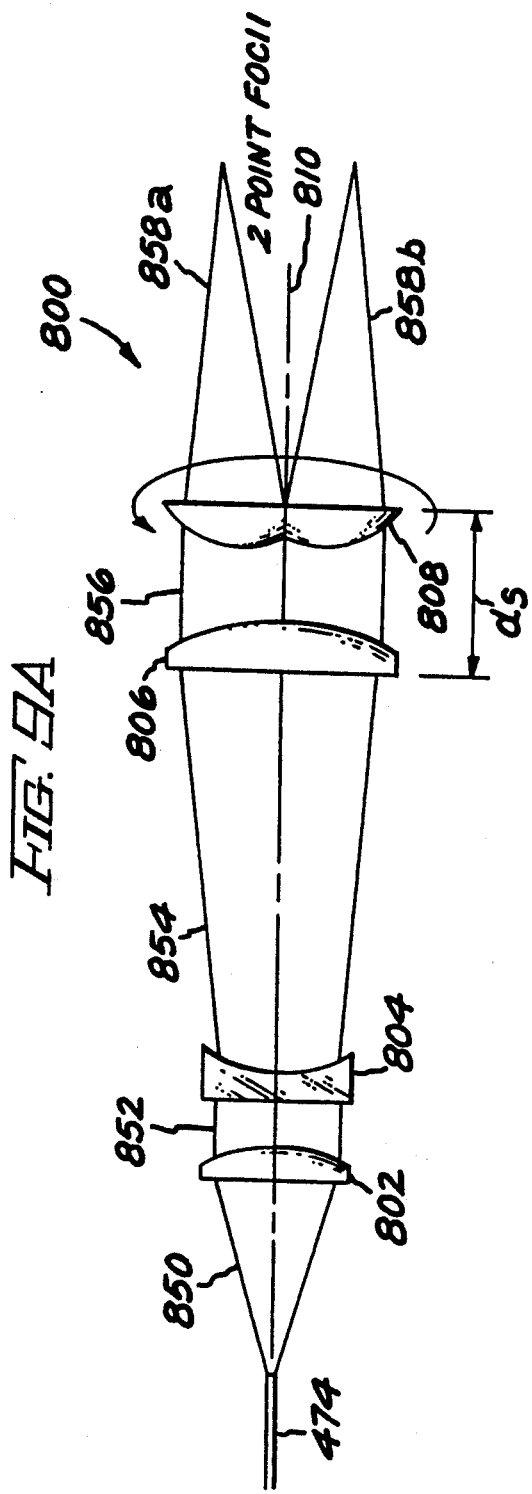
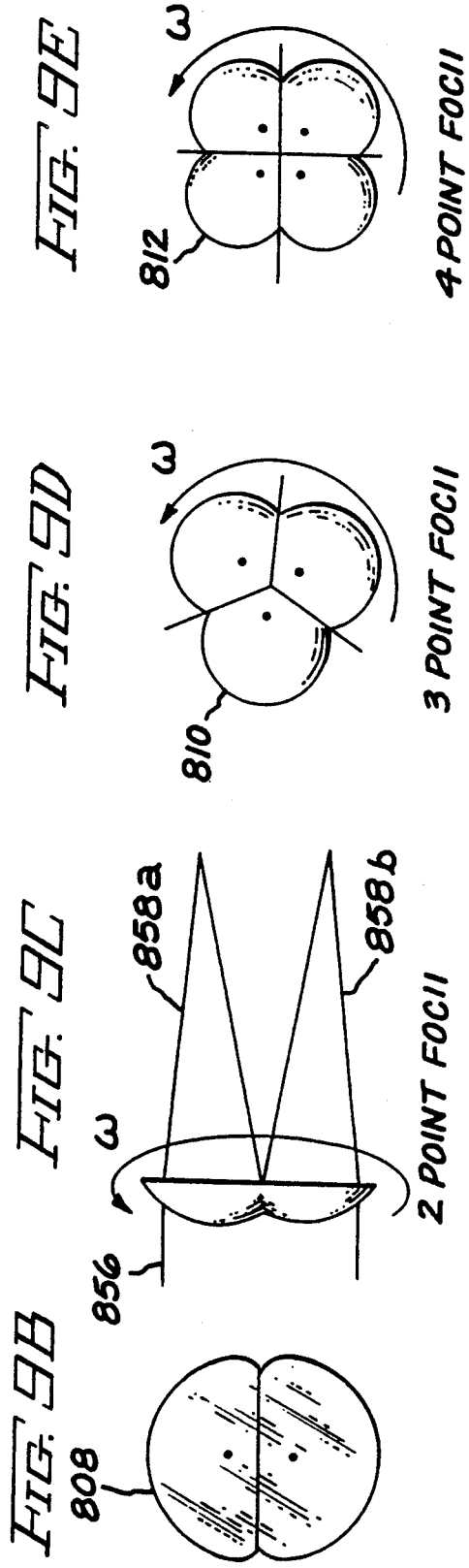

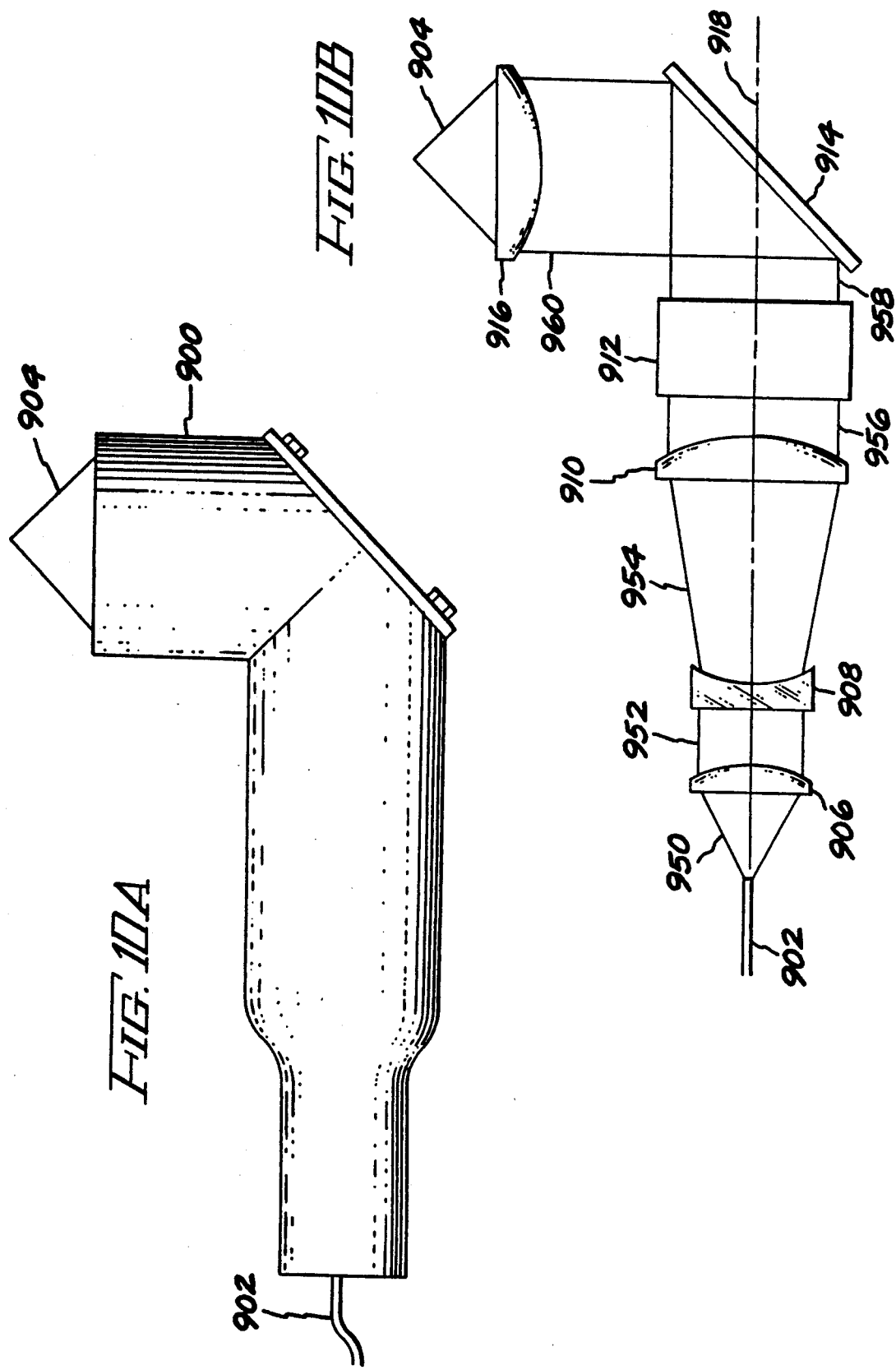

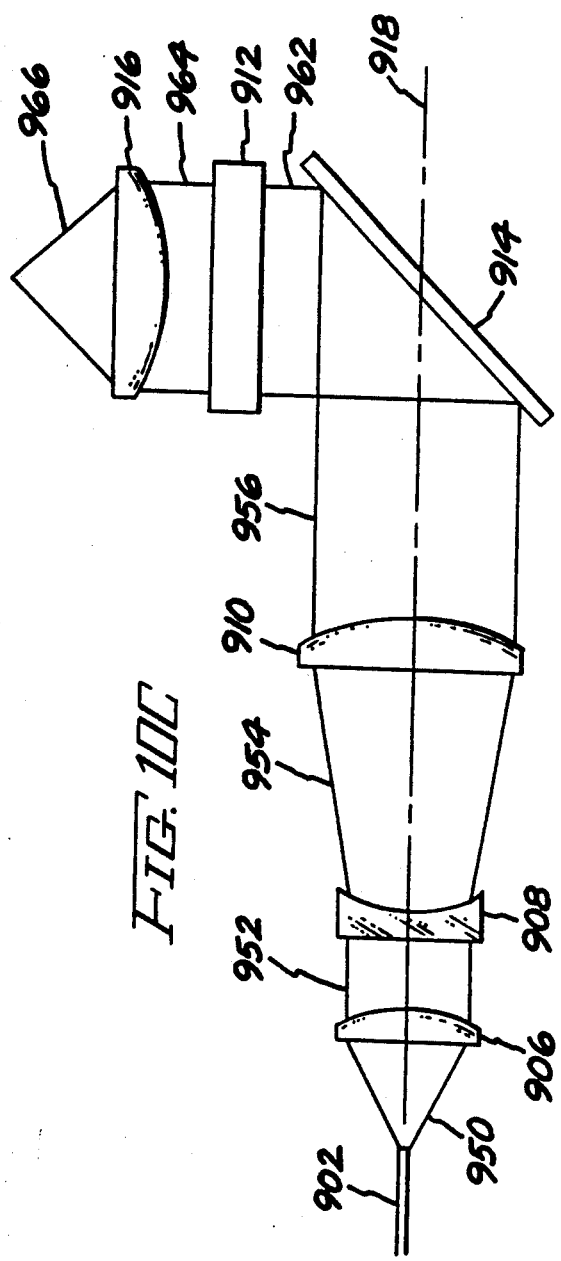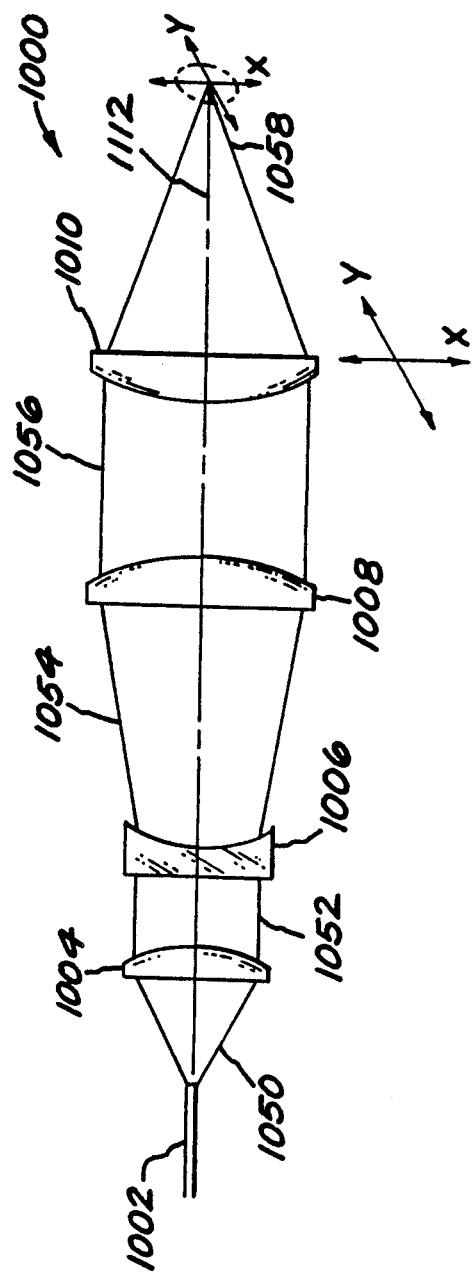

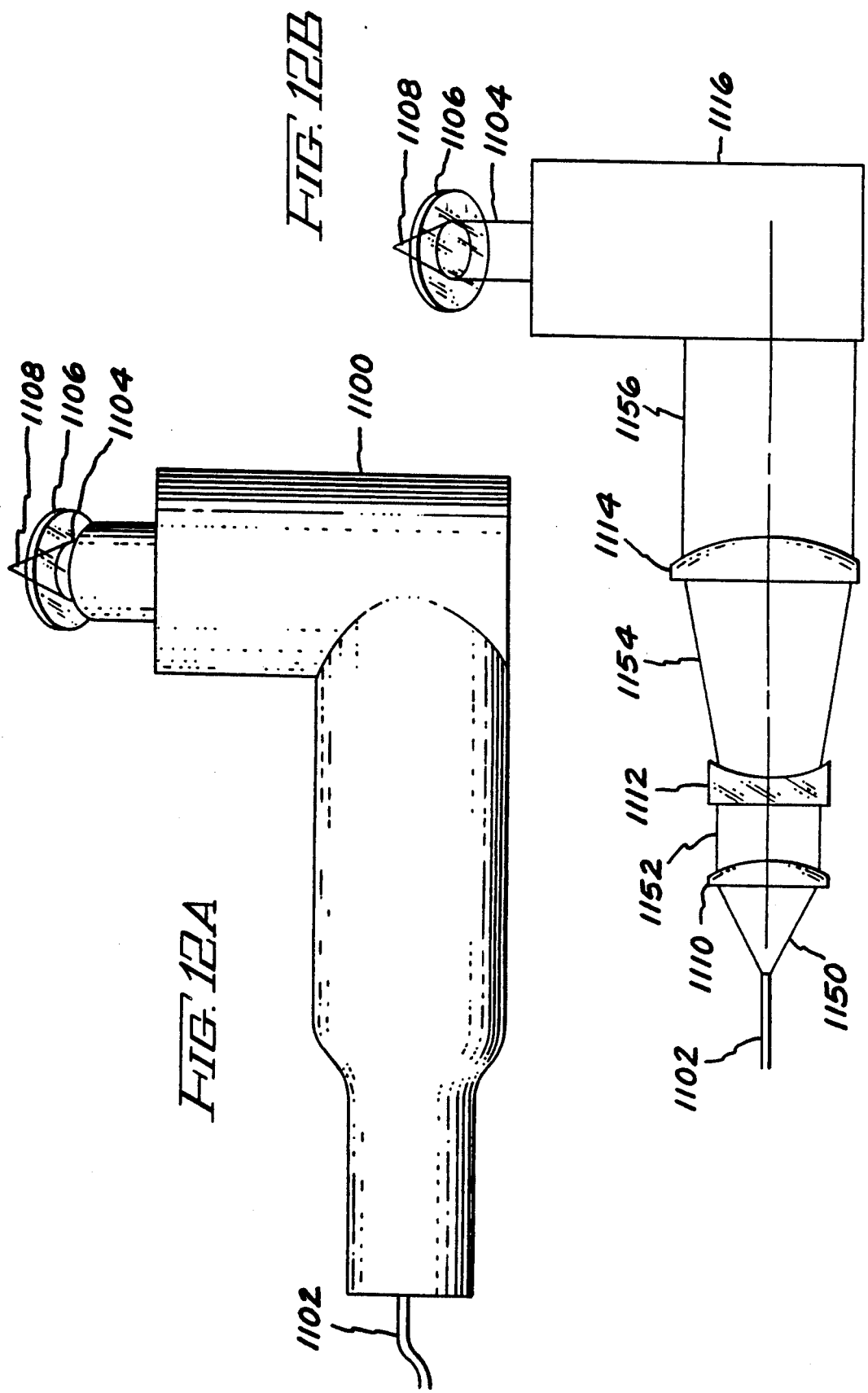

FIBER OUTPUT COUPLER WITH BEAM SHAPING OPTICS FOR LASER MATERIALS PROCESSING SYSTEM

The present invention is directed in general toward processing of materials, and more specifically, to an apparatus for processing of materials and utilizing a high power laser beam transmitted through an optical fiber and through an output coupler including beam shaping optics.

BACKGROUND OF THE INVENTION

Laser materials processing as known in the art and as used herein refers to performance of materials processes such as cutting, welding, drilling and soldering, using a high power continuous wave or pulsed laser beam. The average power of a high power laser beam may range from as little as approximately one watt to hundreds of watts. A user selects the specific power of the beam on the basis of the particular process being performed.

Known art desribes transmitting a laser beam from a laser source to the vicinity of a workpiece by means of an optical fiber. For example, an apparatus and method for injecting a power laser beam into an optical fiber for transmission therethrough are described in commonly assigned U.S. Pat. Nos. 4,564,736, 4,676,586, and 4,681,396 respectively entitled "Industrial Hand Held Laser Tool and Laser System", "Apparatus and Method for Performing Laser Material Processing Through a Fiber Optic", and "High Power Laser Energy Delivery System", the disclosure of each of these patents being incorporated in their entirety herein by reference.

Transmitting a laser beam through an optical fiber to an output coupler also is known. Such an apparatus is described in commonly assigned U.S. Pat. No. 4,799,755, entitled "Laser Materials Processing with a Lensless Fiber Optic Output Coupler", the disclosure of which is incorporated in its entirety herein by reference. In the apparatus described in U.S. Pat. No. 4,799,755, lens systems are not utilized in an output coupler. Rather, a fiber injecting lens is selected to have a focal length of sufficient length to enable the use, for materials processing, of the diverging beam emitted at an output end of the fiber without a need for a beam focusing lens-type output coupler.

An output coupler having a lens system therein for focusing a laser beam transmitted thereto through an optical fiber is disclosed in commonly assigned U.S. Pat. No. 4,844,574, entitled "Optical Fiber Output Coupler for a Power Laser", the disclosure of which is incorporated in its entirety herein by reference. The apparatus described in U.S. Pat. No. 4,844,574 includes a lens system that compensates for adverse effects of fiber transmission in order to improve focused spot power density of the fiber transmitted beam. The lens system illustrated in U.S. Pat. No. 4,844,574 causes a beam to undergo focusing action within the output coupler. In high power laser beam transmission, however, focusing a beam within the coupler is undesirable because the focused beam may cause air in the coupler to ionize. The ionized air will deflect the high power laser beam passing through the coupler and the beam may impinge against and damage components within the coupler. At col. 12, lines 9–16 in U.S. Pat. No. 4,844,574, it is pointed out that a plano-concave or double concave lens which would provide a diverging beam could be utilized, thereby eliminating problems related to focusing a beam within the coupler.

Still other known laser material processing systems utilize lens systems at an output of a laser source. Such systems are described in U.S. Pat. Nos. 3,419,321 and 4,275,288, entitled "Laser Optical Apparatus for Cutting Holes" and "Apparatus for Machining Material", respectively. In each of these systems, optical fibers are not utilized. Therefore, since a laser source generally is a stationary system, at least during a materials processing operation, lenses are aligned with the beam directly output by the laser source. The mobility of such systems is limited.

Further, in some of the above-described systems, in order to perform a materials processing operation on a portion of a workpiece surface larger than the focused spot, either the workpiece or the output coupler must be moved, such as by robotic arm, in order to complete the operation. For example, in a drilling operation, in order to form a large diameter opening such as greater than 40 mils, the output beam of the coupler is focused on the workpiece, and a robotic arm moves the coupler and/or the workpiece, in accordance with a pre-programmed path, along the circumference of the opening being formed. That is, a system operator predetermines a path of movement for the coupler and/or workpiece and, through a user interface to a robotic unit, enters instructions to the robotic unit to control movement of its robotic arm. The workpiece and/or coupler are then engaged to the robotic arm, and during the drilling operation, the output coupler is moved relative to the workpiece, or the workpiece is moved relative to the coupler, to complete the operation.

Programming a robotic unit is a time-consuming task, and the successfulness of the operation depends on the expertise and experience of the system operator. Further, once the material processing operation begins, if the operator determines, for example, that a different diameter hole should be drilled, changes to the pre-programmed operation are necessary. The drilling operation must be stopped and the robotic unit re-programmed. That is, on-the-fly changes to the size, i.e. diameter, of a hole being drilled are not possible. Rather, with known systems, the entire operation is stopped in order to reprogram the robotic unit therefore increasing the time required to complete the operation.

Moreover, in operation, robotic units vibrate, and this vibration generally is transmitted to the arm of the robotic unit. Therefore, it is very difficult to precisely drill a specific diameter opening. Further, when it is desired to form an irregular shaped opening or even an ellipse-shaped opening, controlling the motions of the robotic arm to precisely form the desired opening is even more difficult. In some operations where precision is necessary, therefore, known systems cannot be used.

It is therefore an object of the present invention to provide a materials processing system which utilizes an optical fiber for transmitting a high power beam to an output coupler, the output coupler having beam shaping optics for controlling the shape of a laser beam output from the coupler.

Another object of the present invention is to provide a materials processing system including an optical fiber and an output coupler which allows on-the-fly variability to a materials processing operation such as varying the diameter of an opening being drilled.

Still another object of the present invention is to provide a materials processing system without requiring that the workpiece or the output coupler undergo trepanning motions to complete a materials processing operation, such as drilling various diameter holes.

Still yet another object of the present invention is to provide a materials processing system including an optical fiber and an output coupler which allows more precise execution of materials processing operations including forming irregular shaped openings to specific dimensions.

SUMMARY OF THE INVENTION

The present laser materials processing system includes apparatus comprising an optical fiber for transmitting a materials processing high power laser beam generated by a materials processing laser source. The optical fiber includes an output end which is positioned within an output coupler. The output coupler includes lens apparatus, each of the lenses being axially aligned with the output end of the optical fiber, for shaping an output beam for a particular use as desired. In one embodiment of the present invention, the lens apparatus includes a first collimating lens. A plano-concave lens is aligned with the first collimating lens and a second collimating lens is aligned with the plano-concave lens. A deverging axicon is aligned with the second collimating lens and a converging axicon is aligned with the diverging axicon. A focus lens is aligned with the converging axicon.

In operation, a laser beam transmitted through the optical fiber and emitted at the output end of the optical fiber is collimated by the first collimating lens. This first collimated beam then is intercepted by the plano-concave lens and is shaped so as to diverge from the axis thereof. The second collimating lens then collimates the diverging beam and this second collimated beam is intercepted by the diverging axicon. The diverging axicon shapes the beam into an annulus shape, the annulus-shaped beam diverging from the lens alignment axis. The annulus-shaped beam is then intercepted by the converging axicon, which deflects the beam causing it to be parallel to the axis. The focusing lens intercepts the beam and focuses the beam onto a workpiece.

In this embodiment, the output beam is annulus-shaped, i.e. ring-shaped, and a large diameter opening can be formed in a workpiece without requiring that the workpiece or coupler be moved. Specifically, the distance between the diverging axicon and the converging axicon can be adjusted, even during operation, in order to adjust the diameter of the ring-shaped output beam. This allows on-the-fly adjustment to the diameter of an opening being formed in a workpiece. Further, since neither the workpiece or coupler need to be moved in order to complete a materials processing operation such as drilling a large diameter opening, both the workpiece and coupler can be maintained in a fixed position with vibration minimized, if not substantially eliminated. Therefore, more precise execution of materials processing tasks is possible with the present invention.

BRIEF DESCRIPTION OF THE DRAWINGS

These and other objects of the present invention, together with further features and advantages thereof, will become apparent from the following detailed specification when read together with accompanying drawings, in which:

FIGS. 3A-G illustrate an optical fiber output coupler and portions thereof constructed in accordance with one embodiment of the present invention;

FIGS. 4A-G illustrate lenses contained in the output coupler illustrated in FIGS. 3A-G and the outputs thereof;

FIGS. 5A-C illustrate another optical fiber output coupler and portions thereof constructed in accordance with another embodiment of the present invention;

FIGS. 6A-C illustrate another embodiment of a lens apparatus and portions thereof which may be utilized in an output coupler in accordance with the present invention;

FIGS. 7A-C illustrate still another embodiment of a lens apparatus and portions thereof which may be utilized in an output coupler in accordance with the present invention;

FIGS. 8A-C illustrate still yet another embodiment of a lens apparatus and portions thereof which may be utilized in an output coupler in accordance with the present invention;

FIGS. 9A-H illustrate another embodiment of a lens apparatus and portions thereof which may be utilized in an output coupler in accordance with the present invention;

FIGS. 10A-C illustrate an L-shaped coupler and lens systems which may be utilized in the coupler in accordance with the present invention;

FIG. 11 illustrates another embodiment of a lens apparatus which may be utilized in an output coupler in accordance with the present invention; and FIGS. 12A-C illustrate still another coupler and lens system which may be utilized in the coupler in accordance with the present invention.

DETAILED DESCRIPTION OF THE INVENTION

Figure 1:
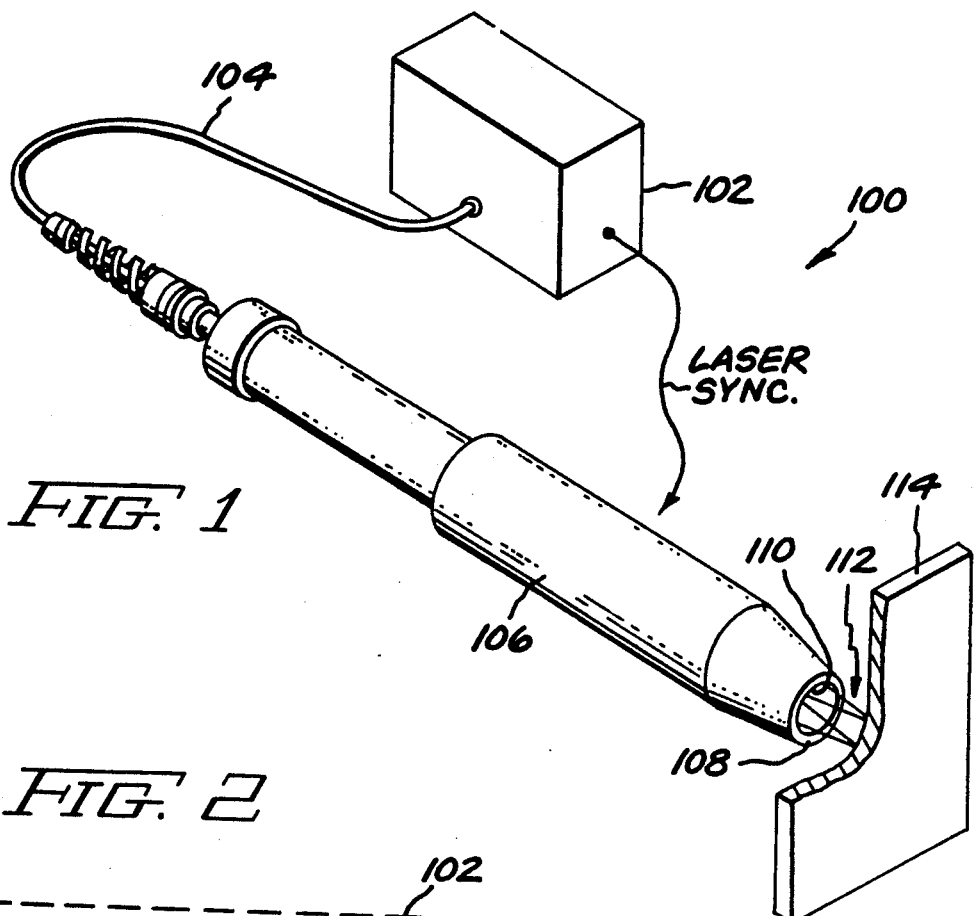
FIG. 1 illustrates a laser materials processing system constructed in accordance with the present invention.

The present invention is directed to laser apparatus for use in a laser materials processing system in which an output end of a beam transmitting optical fiber is supported in an output coupler including beam shaping lenses. Referring now to the drawings, FIG. 1 illustrates a laser materials processing system 100 including a materials processing laser source 102. Laser source 102 may be provided as any high power laser source that generates a high power laser beam suitable for materials processing, for example, an Nd:YAG laser, i.e. neodymium-yttrium aluminum garnet (YAG) laser. Many other lasers are suitable for the present purposes. Nd:YAG lasers have a wavelength generally of 1.06 micrometers, in the near infrared. The high power beam may be a continuous wave or pulsed high power laser beam. If a pulsed high power laser beam is utilized, then a "laser sync" line as shown in FIG. 1 is utilized to provide timing information regarding the position of the lenses within an output coupler. For example, if one of the lenses is rotating in a rotation stage, it is preferable to have the lens aligned with a transmitted beam at the time the beam is intercepted by the lens. Therefore, timing information indicating the timing of a pulsed laser source can be utilized to control the rotation rate of the rotation stage.

Laser source 102 also includes means for injecting a laser beam into an optical fiber 104. Means for injecting the laser beam into the optical fiber are illustrated in further detail in FIG. 2 and may include means such as those described in commonly assigned U.S. Pat. No. 4,564,736, which has been incorporated herein by reference. Optical fiber 104 terminates in an output coupler 106. The output coupler includes an output end 108 which includes an opening 110 formed therein. The opening allows high power laser beams, such as beam 112, to be emitted from the output coupler and utilized to perform material processing operations on a workpiece 114, shown partially in cross section.

Figure 2:
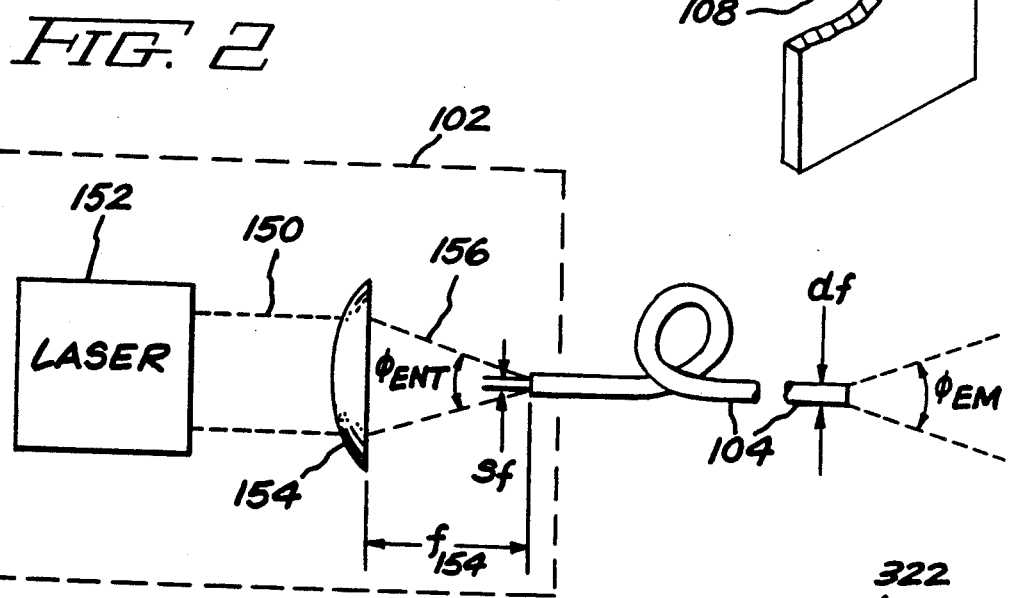
FIG. 2 illustrates injection of a high power laser beam into an optical fiber for transmission therethrough.

FIG. 2 illustrates, in more detail, laser source 102 and the components thereof. More specifically, FIG. 2 diagrammatically illustrates the injection of a collimated high power laser beam 150, generated by a laser 152, into optical fiber 104 for transmission therethrough. The collimated high power laser beam is focused by a focusing lens 154, as a focus portion 156, onto an input end of fiber 104 as a focused spot having a diameter "$S_f$". Focus portion 156 is characterized by an entry cone angle $\phi_{ENT}$. The focal length of lens 154 is $f_{154}$. In accordance with the criteria for successful power laser beam injection into an optical fiber, the focused spot diameter $S_f$ must be less than the diameter $d_f$ of fiber 104. At the output end of fiber 104, the transmitted beam is emitted with an emitted cone angle of $\phi_{EM}$. The emitted beam fully occupies the diameter $d_f$ of the fiber core.

FIG. 3A illustrates an optical fiber output coupler 300 constructed in accordance with one embodiment of the present invention. Coupler 300, which has an overall cylindrical shape, serves to collimate, expand, shape and focus a laser beam transmitted through an optical fiber 302 to provide a focused beam on a workpiece positioned beyond a nozzle portion 304. Coupler 300 comprises a first barrel portion 306 which includes a flange portion 308. Flange portion 308 includes an internally threaded portion 310 for receiving in threaded engagement an externally threaded fiber mounting bracket 312 which supports fiber 302. Flange portion 308 includes a shoulder portion 313 which serves as a stop against which mounting bracket 312 is screwed during assembly of coupler 300. Fiber 302 is introduced through a connector 314 that includes a threaded male portion 316 which matingly screws into an interior threaded bore 318 of the fiber mount bracket. The connector serves to rigidly grasp a protective polyethylene tube 320 which contains the optical fiber. The practice of using such protective tubing is preferred but is not essential to the practice of the present invention. The tubing is terminated within the body of connector 314 so that only the fiber emanates therefrom. Connector 314 may be provided as a tube fitting such as model FH4BZ thermocouple connector manufactured by the instrumentation connections division of the Parker-Haniffin Corporation of Huntsville, Ala. Comparable connectors are also available as Swagelok tube fittings manufactured by the Crawford Fitting Company of Solon, Ohio.

Figure 3B:
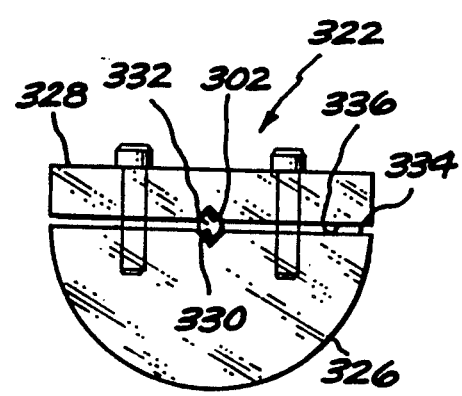

Fiber 302 emanating from connector 314 is next supported in a split fiber holder 322. FIG. 3B illustrates an end view of holder 322 as viewed along the section line 3B—3B shown in FIG. 3A. Holder 322 includes a neck portion 324 threaded for screw engagement with interior bore 318 of mount bracket 312. The neck portion also includes a hollow bore of sufficient diameter to allow the free passage therethrough of fiber 302. Neck portion 324 is contiguous with a base portion 326 which includes four threaded holes, three of which are visible in FIGS. 3A and 3B. A cap 328 includes four holes which register with the holes in the base portion when the cap is mounted in place. The base portion and cap respectively include axial grooves 330 and 332 for receiving fiber 302. The respective grooves have a depth selected such that with fiber 302 in place, opposing faces 334 and 336 of the base portion and cap, respectively, do not make contact. Bolts are passed through the holes in the cap and screw tightened into the threaded holes of the base portion to compress fiber 302 within grooves 330 and 332 between the base portion and cap and thereby rigidly support the fiber against movement. By loosening and retightening of the bolts, axial adjustment of the end of the fiber held by the fiber holder is possible. Fiber 302 is preferably axially positioned within its holder such that the free end of the fiber extends beyond the holder by a distance of approximately one inch. Fiber holder 322 is preferably fabricated of fused quartz in order to be transparent to laser energy and thereby avoid heating or damage that would otherwise be caused by inadvertent impingement thereon of such laser energy. If the laser energy is sufficiently low or the inadvertent laser impingement is not otherwise a concern, the fiber holder can be fabricated of other materials, e.g. plexiglass.

Referring again to FIG. 3A, first barrel portion 306 further includes an internal threaded portion 350 for receiving in threaded engagement an externally threaded barrel portion 352. An externally threaded locking ring 354 and an internally threaded locking ring 356 are provided to lock the installed position of barrel portion 352 within barrel portion 306 against movement. Barrel portion 352 is generally internally threaded except for a lens mounting shoulder 358. A first plano-convex lens 360 for collimating the laser beam emitted from the end of fiber 302 is mounted against the side of shoulder 358 nearest the end of fiber 302. Lens 360 is held in place against shoulder 358 by a retaining ring 362 that is externally threaded for engagement with the interior thread of barrel portion 352. A plano-concave lens 364 is mounted against the other side of shoulder 358 for expanding the collimated beam provided by lens 360. Lens 364 is held in place against shoulder 358 by an externally threaded retaining ring 366 that engages the interior thread of barrel portion 352. Coupler 300 further includes a second barrel portion 368 which is generally internally threaded to enable screw engagement. A second plano-convex lens 370 for collimating a beam emitted from lens 364 is held in place against shoulder 372 by a retaining ring 374 that is externally threaded for engagement with the interior thread of second barrel portion 368. A diverging axicon 376 is held in place against shoulder 378 by a retaining ring 380. A converging axicon 382 is mounted in a threaded mounting ring 384 and retained in the mounting ring by a retaining ring 386. When installed, mounting ring 384, with axicon 382 mounted thereon, is disposed against, but movable relative to, an internal shoulder 388 of second barrel portion 368. Converging axicon 382 is mounted at its other end to a spacer member 390 mounted to a platform 392. Platform 392 forms part of a linear translation unit 394 which is shown in more detail in FIGS. 3C and 3D. Translation unit 394 is mounted to second barrel portion 368 by threaded bolts 396a and 396b which are threadedly engaged to the second barrel portion and held in engagement therewith by threaded nuts 398a and 398b. Translator 394 generally is coupled to a motor to control operation thereof.

Specifically, referring to FIGS. 3C and 3D, translator 394 is shown in top view in FIG. 3C and side view in FIG. 3D. A 6-volt dc micromotor 399 is coupled to shaft 400 of translator 394. The translator and the micromotor are well known in the art and commercially available, for example, from National Aperture, Inc. of Lantana, Fla., model MM-3X, single stage translator attached to micromotor MM-3M. It should be noted that lens 376 could be mounted on a translator and moved relative to lens 382. The important feature is that the distance between lenses 376 and 382 be adjustable. Many other commercially available translation units and motors could be utilized.

Translator 394 includes a platform 402 including openings 404a and 404b for being threadedly engaged to a spacer member 390. A spring 405 is disposed between platform 402 and an engagement portion 406b to facilitate adjusting the position of platform 402. Translator 394 also includes engagement portions 406a and 406b which are shown in FIG. 3A as being attached to spacer members 408a and 408b respectively. Threaded bolts 396a and 396b are inserted through openings in portions 406a and 406b and threadedly engaged to second barrel portion 368 of system 300. In operation, as motor 399 rotates shaft 400, platform 402 moves linearly relative to engagement portions 406A and 406B. In this manner, the position of axicon 382 may be adjusted relative to axicon 376. Motor 398 also is reversible so that shaft 400 can be rotated by the motor in both clockwise and counter-clockwise rotation. Therefore, the position of axicon 382 is adjustable relative to axicon 376 in order to increase or decrease the separation distance and control the materials processing operation as hereinafter explained. Further, activation and deactivation of the motor may be controlled by a simple switching operation or may be computer controlled.

For example, and with regard to a computer-controlled operation, the desired diameter and location of openings to be formed or other materials processing operations could be predetermined and stored within the memory of the computer. This information could be stored in a look-up table such as the following table:

| Opening | Linear translation | Opening dimensions |
| --- | --- | --- |
| 1 | $X_1$ | $d_{x1}$ |
| 2 | $X_2$ | $d_{x2}$ |
| 3 | $X_3$-$X_4$-$X_3$ | $H = h_1, W = w_1$ |

With this table, a first opening to be drilled has a diameter $d_{x1}$ and requires that the linear translator be located at a position $X_1$. Likewise, a second opening to be drilled has a diameter $d_{x2}$ and requires that the linear translator be at a position $X_2$. A third opening to be formed requires that during formation of the opening, the linear translator move from a position $X_3$ to a position $X_4$ and then back to position $X_3$. As a result of this translation, an opening having a height H of $h_1$ and width W of $w_1$ will be formed. This third opening will have an elliptical shape. Many other translation movements are contemplated. Generally this information is predetermined and entered by a system user.

Referring again to FIG. 3A, a plano-convex focusing lens 410 is mounted at the end of barrel portion 368 remote from axicon 382 and is held in place by an externally threaded retaining ring 412 which engages the internally threaded portion of the second barrel portion at the end thereof. Though not essential to the practice of the present invention, coupler 300 is preferably fitted with a gas manifold 414 for delivering a cover gas to nozzle portion 304 during materials processing such as welding. The construction of gas manifold 414 is well known in the art. Nozzle 304 is illustrated as screwing into the free end of the gas manifold and is configured to deliver the cover gas through an opening 404 at the end thereof. Opening 404 is sufficiently large to enable a focused portion of the laser beam, provided by focusing lens 410, to pass without obstruction therethrough. As an additional optional feature of the present invention, coupler 300 is fitted with a glass slide 416 which serves to protect lens 410 against any backsplattering that may occur during materials processing. An o-ring 418 is interposed between slide 416 and the end of second barrel portion 368 to provide support for the slide with the manifold in place. The slide is thus held in place against the o-ring by the gas manifold.

Other embodiments of nozzles which may be utilized with the present output coupler 300 are illustrated in FIGS. 3E, 3F and 3G. Specifically, in FIG. 3E, a nozzle 420 includes manifold 414. Nozzle 420 further includes an outer wall 422 and an inner wall 424 spaced therefrom. A flowpath 426 is defined between outer wall 422 and inner wall 424. When gas is input through manifold 414, the gas travels through flowpath 426 and is emitted at a high speed at the end of path 426 towards the workpiece. This nozzle provides the advantage that the gas flows at a greater speed from nozzle 420 and also aids in further preventing backsplatter into the nozzle during a materials processing operation.

Another nozzle 428 is illustrated in FIG. 3F to show that an outer wall 430 and an inner wall 432 may terminate at approximately the same point. Nozzle 434 illustrated in FIG. 3G includes an outer wall 436, a first inner wall 438 and a second inner wall 440. With nozzle 434, two gas manifolds 414A and 414B are utilized. Manifold 414A corresponds to flowpath 442A and manifold 414B corresponds to flowpath 442B. Nozzle 434 provides the advantage that different gases may be passed through manifolds 414a and 414b respectively, thereby causing two different gases to flow through the different flowpaths. These gases will merge at the ends of the path and combine in a predetermined manner. This provides that the system user can select different gases and select different reactions, which may be desired during operation, at the output end of the nozzle.

Coupler 300 also includes mounting brackets 444 and 446, shown in FIG. 3A, which may be utilized to connect the coupler, for example, to a robotic arm or a stationary arm. Coupler 300 is fabricated such that with the lenses installed and the fiber mounting bracket in place, a predetermined desired alignment is achieved. When fully assembled, lenses 360, 364, 370, 376, 382 and 410 and the portion of fiber 302 extending from fiber holder 322 inclusive of the fiber end are all positioned to be coaxial about a longitudinal axis 470. This aligment about axis 470 is achieved through precise construction of coupler 300 and the rigid support of the lenses and fiber therein. The relative positions of lens 360 relative to fiber 302, and axicon 376 relative to axicon 382, along axis 470, are adjustable during installation due to the screw engagements. As indicated above, the position of the free end of fiber 302 is adjustable within holder 322 during initial installation. The barrel portions, fiber mounting bracket, gas manifold, nozzle and various locking, mounting and retaining rings may be fabricated from a material such as aluminum.

As described with respect of FIG. 3A, the lenses and fiber and hence the portions of the laser beam are all coaxial about axis 470. In consideration that the output coupler of the present invention is intended for use with a high power laser beam, each lens is preferably fabricated of quartz to withstand, without breaking, the heat generated by impingement thereon of the high power laser beam. Further, to provide efficient beam transmission through the output coupler, each lens is coated with a narrow wavelength-band anti-reflection coating selected to maximize transmissivity of the wavelength of the high power laser beam being employed. Such coatings are well known in the art and optical elements so coated are available from CVI Laser, Inc. of Albuquerque, N.M.

Further in accordance with the practice of the present invention, the end of fiber 302 is prepared in a manner to assure that a uniformly conical beam is emitted therefrom and further, that the emitted beam does not cause buring of the cladding or jacket of the fiber. A manner of end preparation is described in the above incorporated patents directed to injecting a high power laser beam into an optical fiber for transmission therethrough. While the fiber end preparation described therein serves to facilitate beam injection, it also serves to accomplish the above-described characteristics of the emitted beam when that end preparation is practiced on the fiber output end. The present invention is not directed to any specific method or type of fiber output end preparation.

The end preparation, not shown in FIG. 3A, is diagrammatically illustrated in FIG. 4A wherein fiber 302 is shown to have a layered structure typical of a step-index or graded index type fiber, both types of fibers being preferred herein for high power laser beam transmission. The successive portions 480, 482, and 484 of fiber 302 respectively correspond to the fiber with jacket, fiber without jacket but with cladding exposed, and fiber with the bare core exposed without cladding. It is noted that other fiber types known in the art are suitable for high power laser beam transmission and would have different layered structures. Such fibers would be subjected to end preparation in a manner analogous to that taught in the above incorporated patents.

Referring to FIG. 4A, the operation of the respective lenses and fiber 302 illustrated in FIG. 3A are described in greater detail. For clarity, FIG. 4A illustrates fiber 302, lenses 360, 364, 370 and 410, and axicons 376 and 382. In accordance with the preferred embodiment of the present invention, the high power laser beam delivered to fiber 302 is emitted from the end thereof as a diverging beam 450 which diverges with an emitted cone angle $\phi_{EM}$. The emitted beam is collimated by collimating lens 360 into a first collimated beam 452 having a diameter $D_{c1}$. Lens 360 has a focal length $f_1$ and is positioned a distance $f_1$ from the end of fiber 302. Collimated beam 452 is intercepted by lens 364. The distance between lens 360 and 364 is not critical. Lens 364 expands collimated beam 452 into a diverging beam 454. Beam 454 then is collimated by second collimating lens 370 which creates a second collimated beam portion 456 having a diameter $D_{c2}$. The spacing between lens 364 and 370 generally is selected in accordance with the amount of expansion desired as hereinafter explained in more detail. Lens 364 has a focal length $f_e$ and lens 370 has a focal length $f_o$ as illustrated in FIG. 4B. The second collimated beam is intercepted by diverging axicon 376. An axicon is an optical device well known in the art, and for purposes herein may be defined as an optical device which produces a darkened area at the center of a beam of light when light passes through it. This darkened area may be a cone if the axicon is circular or may be elongated if the axicon is elongated. Axicon 376, as illustrated in more detail in FIGS. 4C-D, is circular-shaped and forms a ring-shaped beam, shown in cross-section as beams 458a and 458b. Beam portions 458a and 458b diverge from axis 470 and are intercepted by converging axicon 382, shown in more detail in FIGS. 4E-F. Axicon 382 is circular-shaped and the ring-shaped beam, shown in cross-section as beam portions 460a and 460b, output by lens 382 is substantially parallel to axis 470. Beam portions 460a and 460b are intercepted by lens 410 having a focal length $f_2$ which focuses the ring-shaped beam, shown in cross-section, as beams 462a and 462b.

Distance $d_1$ between axicon 376 and axicon 382 can be adjusted, as hereinbefore explained, to control the diameter of the ring-shaped beam. For example, as shown in FIG. 4G, with distance $d_1$ between axicon 376 and axicon 382, the diameter of the beam may be equal to the diameter of circle A. If the distance between axicon 376 and axicon 382 is increased to be equal to $d_1 + x$, then the diameter of the ring-shaped may be increased to equal the diameter of circle B, and if the distance between axicon 376 and axicon 382 is decreased by a distance y, i.e. $d_1 - y$, then the diameter of the ring-shaped beam may be decreased to equal the diameter of circle C.

During a materials processing operation, such as drilling, and once the diameter of the ring-shaped beam output by the coupler is adjusted to a desired diameter, the workpiece is maintained at a distance substantially equal to focal length $f_2$ from lens 410. The ring-shaped beam then strikes the workpiece cutting a ring-shaped opening therein. During the drilling operation, the diameter of the ring-shaped beam can be changed to another diameter by adjusting distance $d_1$ between axicons 376 and 382. Therefore, the present system allows on-the-fly variability of the diameter of an opening being drilled. Further, the present system, by providing beam shaping optics within the output coupler, provides that a materials processing operation, such as drilling a large diameter hole, can be performed without requiring that the workpiece or output coupler be moved during the operation. This feature eliminates the time-consuming task of reprogramming a robotic unit, reduces the time required to perform some materials processing operations, and allows more precision in a drilling operation.

In materials processing, it generally is desirable to maximize the beam power density at the focused spot. With the lens system illustrated in FIG. 4A, the focused spot actually is ring-shaped as illustrated in FIG. 4G. Power density maximization is desirable since most laser materials processes, e.g. welding, will not occur below a minimum required power density and such processes will proceed with increased speed in proportion to the amount by which the focused spot power density exceeds the minimum required power density. The focused spot power density is related to beam quality. More specifically, beam quality of the optical fiber $BQ_f$ is defined as:

$$BQ_f = d_f \cdot \phi_{EM}, \qquad (1)$$

where $d_f$ is the diameter of the fiber and $\phi_{EM}$ is the beam output divergence angle, as shown in FIG. 2. With respect to FIG. 4A, $$\phi_{EM} = \frac{D_{c1} - d_f}{f_1}. \qquad (2)$$

Therefore, $$BQ_f = d_f * \left[\frac{D_{c1} - d_f}{f_1}\right] = \frac{D_{c1}d_f - d_f^2}{f_1}. \qquad (3)$$

Further, diameter $D_{c2}$ of the second collimated beam 456 is equal to:

$$D_{c2} = NX * D_{c1}, \qquad (4)$$

where NX is the expansion ratio of a beam intercepted by the combination of lenses 364 and 370, sometimes referred to in the art as a Galilean telescope. The expansion ratio is determined by:

$$NX = \frac{f_o}{|f_e|}, \qquad (5)$$

$f_o$ being the focal length of lens 370 and $f_e$ being the focal length of lens 364 as illustrated in FIG. 4B. Therefore, $$D_{c2} = \frac{D_{c1} * f_o}{|f_e|}. \qquad (6)$$

Focused spot size SS is defined as:

$$SS = BQ_f \frac{f_2}{D_{c3}}, \qquad (7)$$

where the beam quality output from the fiber is substantially equal to the beam quality of the focused beam, and a diameter $D_{c3}$ of the beam intercepted by focusing lens 410 is dependant upon separation distince d1 between axicon 382 and axicon 376, and distance $D_{c2}$. By substituting values, focused spot size is expressed as:

$$SS = \left[\frac{D_{c1}d_f - d_f^2}{f_1}\right] * \left[\frac{f_2}{D_{c3}}\right]. \qquad (8)$$

Thus, from equation 7, it should be apparent that the focused spot size can be reduced, thereby increasing power density, by utilizing a smaller diameter optical fiber, optimizing the focusing lens focal length, and/or optimizing the Galilean telescope expansion ratio.

Figure 5B:
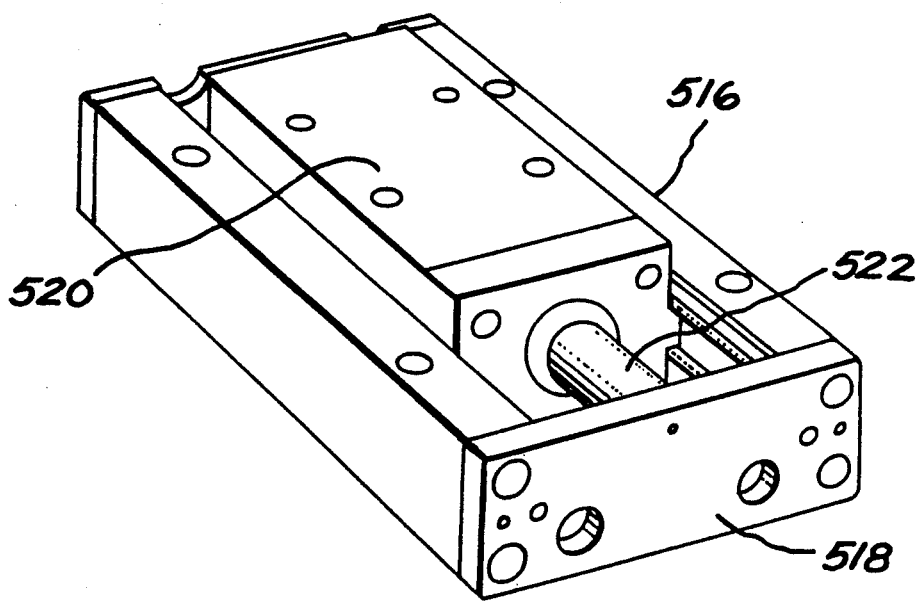

FIG. 5A illustrates another embodiment 500 of an output coupler in accordance with the present invention. Output coupler 500 includes a first collimating lens 502, a plano-concave lens 504, a second collimating lens 506, a diverging bi-prism 508, and a focusing lens 510. Some of the specific connections in coupler 500 are substantially similar to the connections earlier explained with regard to coupler 300. Further, components of coupler 500 which correspond to components of coupler 300 have identical identification numbers in FIG. 5A.

Figure 5C:
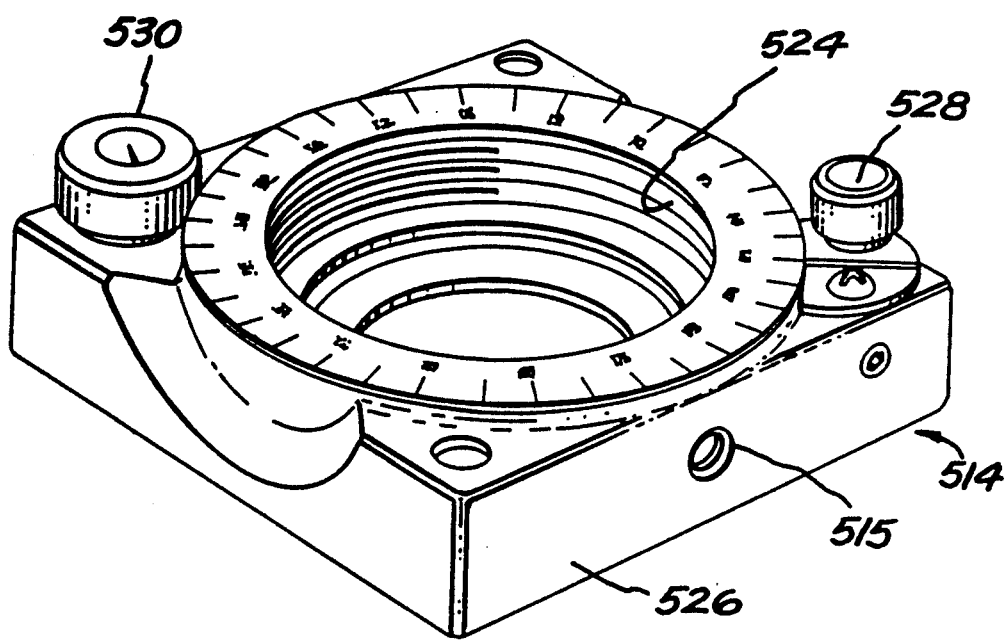

In coupler 500, diverging bi-prism 508 is mounted within a rotation stage 514 mounted to a translator 516. Translator 516 and rotation stage 514 are illustrated in more detail in FIGS. 5B and 5C, respectively. Specifically, translator 516 may be a commercially available unit such as a miniaturized motorized translator available from Oriel Corporation, Stratford, Conn., Model No. 16727-miniaturized motorized translator. The translator generally is driven by a motor such as the miniaturized motor previously described with regard to coupler 300 in FIG. 3a. Translator 516 includes a base portion 518 and a platform portion 520 mounted so as to be movable relative to base portion 518. A shaft 522 extends through base portion 518 and platform 520, and as shaft 522 rotates, platform 520 moves relative to base portion 518. Base portion 518 includes bolt holes which provide that the translator may be mounted to the barrel of coupler 500. Utilization of the translator provides that distance $d_2$ between bi-prism 508 and lens 510 is possible.

Rotation stage 514 is mounted to platform 520 such as by a bolt passed through opening 515 and an opening in platform 520 and includes a rotating ring portion 524 which rotates relative to base portion 526. A lock nut 528 is utilized to lock a lens within rotation stage 514 and a motor coupling 530 is utilized to couple the rotation stage to a motor. Rotation stage 514 generally may be a commercially available unit such as the compact rotation stage available from Newport Corporation, Fountain Valley, Calif., Model No. RSA-2T, compact rotation stage. The rotation stage generally is driven by an air motor, such as an air motor available from Micromotors, Inc., Santa Ana, Calif., Model No. MMR-0001, coupled to coupling 530. The rotations per minute (rpm) of the rotation stage is controllable by controlling the pressure (psi) supplied to the motor, thereby controlling the revolutions per minute (rpm) and torque output by the motor. The rpms generally may vary from between 7-110 rpms and may be adjusted to a desired rotation speed. An electric motor with encoders may be substituted for the air motor as is known in the art. The desired rpm of the rotation stage is determined from laser synchronization timing pulses through a computer and interface means when using a pulsed laser source. The rpm of the motor is set at a rate such that laser pulses overlap on workpiece thus "cutting the hole" being processed.

More specifically, the position of the linear translator and the rotation of the rotation stage generally are computer controlled. For example, a look-up table, stored within the computer's memory, includes the following information for a given laser repetition rate and focus lens:

| Opening | Linear translation | RPM | Opening dimensions |
|---------|--------------------|----|--------------------|
| 1 | $X_1$ | $rpm_1$ | $d_{x1}$ |
| 2 | $X_2$ | $rpm_2$ | $d_{x2}$ |

As shown in the above table, a first opening to be formed has a diameter $d_{x1}$ and requires that the linear translator be located at a position $X_1$ and that the rotation stage be rotated at $rpm_1$. Likewise, a second opening to be formed has a diameter $d_{x2}$, and requires that the linear translator be located at a position $X_2$ and that the rotation stage be rotated at $rpm_2$. This information stored in the computer can be used during a materials processing operation to form the desired openings. Generally this information is predetermined and entered by a system user.

The lens system of coupler 500 is further illustrated in FIGS. 6A–C. Specifically, first collimating lens 502 is axially aligned with output end 474 of optical fiber 302. Plano-concave lens 504 is aligned with the first collimating lens and second collimating lens 506 is aligned with the plano-concave lens. Diverging bi-prism 508 is aligned with second collimating lens 506. Diverging bi-prism 508 is mounted so as to be rotatable as hereinbefore described. Diverging bi-prism 508, as shown in FIGS. 6B–C, is circular shaped and is utilized to split a beam passed therethrough. Focusing lens 510 is aligned with diverging bi-prism 508. Lenses 502, 504, 506 and 510, and diverging bi-prism 508 are all positioned to be coaxial about a longitudinal axis 512.

In operation, and utilizing apparatus 500, a diverging beam 550 emitted from fiber 474 is intercepted by first collimating lens 502. Lens 502 forms a first collimated beam 552 which then is intercepted by plano-concave lens 504, which forms a diverging beam 554. Second collimating lens 506 intercepts diverging beam 504 and forms a second collimated beam 556. Diverging bi-prism 508 intercepts the second collimated beam and forms split beams 558A and 558B diverging from axis 512. Focusing lens 510 intercepts beams 558A and 558B and focuses each beam on a workpiece.

During operation, rotation of diverging bi-prism 508 causes the focused spot of each beam to rotate to complete a material processing operation. Distance $d_2$ between diverging bi-prism 508 and focusing lens 510 is adjustable, and by adjusting distance $d_2$, the distance between the focused spots can be adjusted. Importantly, the rate of rotation of the rotation stage and the position of diverging bi-prism 508 relative to lens 510 is adjustable, even during a materials processing operation. Therefore, on-the-fly adjustments to the dimensions of a hole being drilled can be made. Further, irregular shaped openings and elliptical shaped openings can be formed utilizing this embodiment. Specifically, by varying the rotation rate and separation between diverging bi-prism 508 and lens 510, the position of each focused spot can be controlled in a desired manner to form the desired opening.

FIGS. 7A–C illustrate another embodiment 600 of a lens apparatus which may be utilized in combination with coupler 300. Apparatus 600 includes a first collimating lens 602 axially aligned with optical fiber 474. A plano-concave lens 604 is axially aligned with first collimating lens 602, and a second collimating lens 606 is aligned with lens 604. A converging bi-prism 608 is aligned with second collimating lens 606 and a focusing lens 610 is axially aligned with converging bi-prism 608. Each of the lenses and the bi-prism are positioned to be coaxial about a longitudinal axis 612. Converging bi-prism 608 is rotatable about axis 612, and may be mounted in a rotation stage coupled to a translator in a manner substantially similar to the manner in which lens 508 is mounted in embodiment 500. Further, as illustrated in FIGS. 7B–C, converging bi-prism 608 has a substantially circular-shape and splits a beam intercepted thereby into two separate converging beams.

In operation, diverging beam 650 is output from optical fiber 474. First collimating lens 602 intercepts beam 650 and forms a first collimated beam 652. Beam 652 is intercepted by lens 604 and forms a diverging beam 654 diverging from axis 612. Diverging beam 654 is intercepted by lens 606 which forms a second collimated beam 656. Second collimated beam 656 is intercepted by bi-prism 608, which forms converging beams 658A and 658B. The converging beams are intercepted by focusing lens 610 which focuses beams 660a and 660b onto the workpiece. As lens 608 rotates, beams 660a and 660b also rotate thereby facilitating completion of a materials processing operation. The separation of focused points of beam 660a and 660b is adjustable, even during a materials processing operation, by adjusting distance $d_3$ between bi-prism 608 and lens 610.

Still another embodiment of a lens apparatus 700 which may be utilized in combination with coupler 300 is illustrated in FIG. 8A. Again, the lenses are mounted in a manner substantially identical to the manner in which the lenses are mounted in embodiment 500. Apparatus 700 includes a first collimating lens 702 axially aligned with optical fiber 474. A plano-concave lens 704 is aligned with lens 702, and a second collimating lens 706 is aligned with lens 704. A rotatably-mounted wedge prism 708 is aligned with second collimating lens 706, and a focusing lens 710 is aligned with wedge prism 708. Each of the lenses and the wedge prism are axially aligned along axis 712 and in alignment with optical fiber 474. Further, the wedge prism may be mounted in a rotation stage coupled to a translator in a manner substantially similar to the manner in which lens 508 is mounted in embodiment 500. Also, prism 708, as shown in FIGS. 8B–C, is substantially circular-shaped and deflects a beam intercepted thereby as hereinafter explained.

In operation, a diverging beam 750 is output from optical fiber 474, and diverging beam 750 is intercepted by lens 702. Lens 702 forms a first collimated beam 752 which then is intercepted by lens 704. Lens 704 forms a diverging beam 754 which diverges from axis 712. The diverging beam then is intercepted by second collimating lens 706 which forms a second collimated beam 756. The collimated beam then is intercepted by wedge prism 708 which forms a diverging beam 758 and diverging beam 758 is then intercepted by focusing lens 710, which focuses beam 760 onto the workpiece. As wedge prism 708 rotates, beam 760 rotates therewith. Further, distance $d_4$ between prism 708 and lens 710 can be adjusted in order to vary the dimension of the opening formed by beam 760 as prism 708 rotates.

FIG. 8B is a front view of circular-shaped wedge prism 708, and FIG. 8C is a view through line 8C—8C of FIG. 8A. As shown in FIG. 8C, as beam 756 is intercepted by lens 708, a deflected beam 758 is formed thereby. The divergence angle $\phi_d$ is illustrated as being the angle between axis 712 and the rays of beam 758. As further shown in FIG. 8C, the angle of the wedge prism 708 is represented as $\phi_w$. The beam divergence angle is represented as:

$$\phi_d = \arcsin(n \sin \phi_w) - \phi_w \qquad (9)$$

where n equals the index of quartz at the wavelength of the beam output by optical fiber 474.

Still another embodiment 800 of a lens apparatus which may be utilized in combination with coupler 300 is illustrated in FIG. 9A. The lens are mounted in a manner substantially identical to the manner in which the lenses are mounted in embodiment 500. Specifically, in FIG. 9A, a first collimating lens 802 is axially aligned with optical fiber 474. A plano-concave lens 804 is aligned with lens 802 and a second collimating lens 806 is aligned with lens 804. A split lens 808 is aligned with collimating lens 806. Lenses 802, 804, 806 and 808 are each axially aligned along axis 810 with optical fiber 474. Further, focal lens 808 may, for example, be two-split lenses as illustrated in FIGS. 9B-C. Other multiple lenses may also be utilized, and for example, may be a three-split lens 810 as illustrated in FIG. 9C or a four-split lens 812 as illustrated in FIG. 9E. Further, lens 808 is rotatable and may be mounted in a rotation stage and a translator in a manner substantially similar to the manner in which lens 508 is mounted in embodiment 500.

Figure 9F:
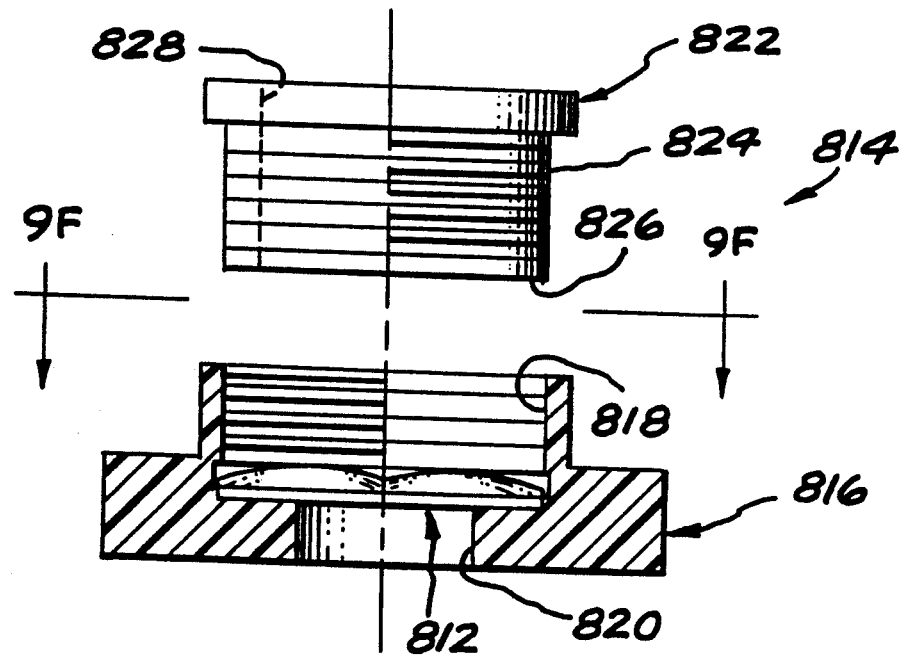
Figure 9G:
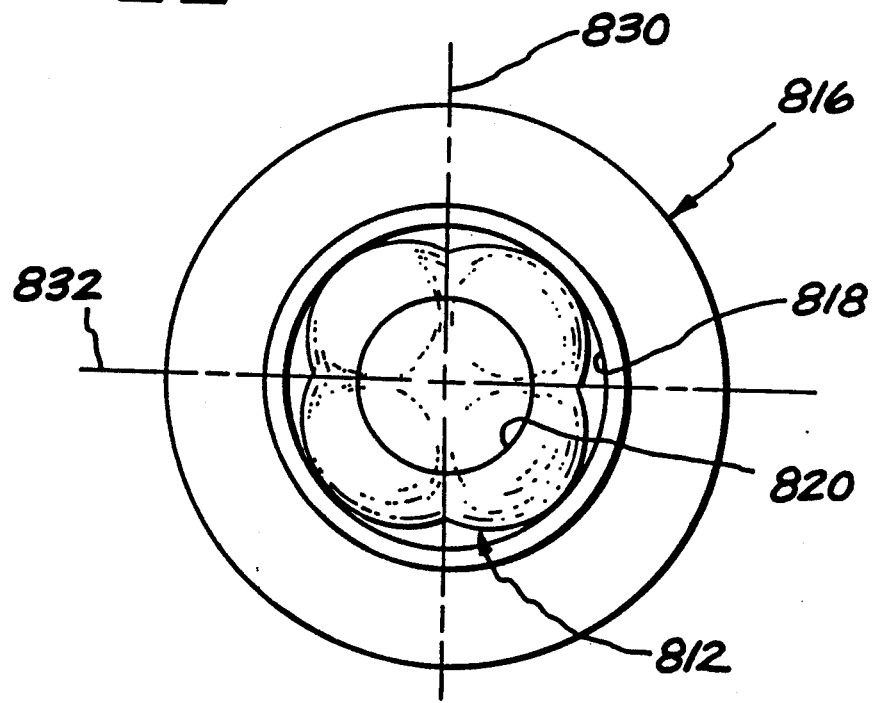

FIG. 9F illustrates an exploded view of the lens mounting apparatus 814 for mounting the lens portion of lens 812. A similar lens mounting apparatus would be utilized for each lens 808 and 810. The lens mounting apparatus illustrated herein is substantially similar to the lens mounting apparatus disclosed in commonly assigned U.S. Pat. No. 4,795,227, entitled "Beam Splitting Fiber Optic Coupler", which is incorporated, in its entirety, herein by reference. Apparatus 814 includes a lens seat portion 816 which further includes cavity portion 818 in which the lens portion of lens 812 is shown to be seated. FIG. 9G illustrates a sectional view through line 9G—9G of FIG. 9E, and as can be seen, cavity portion 818 is cylindrical and circular in cross section to receive the generally circular overall cross section of lens 812. It should be apparent that the two lens portion of lens 808 and the three lens portion of lens 810 could as readily be accommodated in lens seat 816. The interior cylindrical surface of cavity 818 is threaded.

Lens seat 816 further includes a circular aperture 820 sized to enable passage therethrough of the individual beam portions focused by the lens portions of lens 812. Lens mounting apparatus 814 further includes a cylindrically shaped lens retainer 822. An outer cylindrical portion 824 of lens retainer 822 is threaded to be screw engaged with the thread of cavity portion 818. In this manner, the lens retainer can be screwed down onto lens 812 to rigidly hold it in place. An o-ring (not shown) of any rubber-like material may be interposed between a bottom edge surface 826 of retainer 822 and the lens portion retained thereby to obviate damage to those lens portions. As can be further seen in FIG. 9E, lens retainer 822 includes a cylindrical passage 828 to enable passage of the beam of light, e.g., the collimated laser beam, to be split and focused by lens 812. As can also be seen by the provision of centerline 830 and 832 in FIG. 9G, due to their symmetrical arrangement as described above, the four lens portions of lens 812 are substantially centered within cavity 818 of lens seat 816. As a result, the beam of light directed thereon can be readily aligned so that equal parts of the beam are directed onto the four lens portions.

Figure 9H:
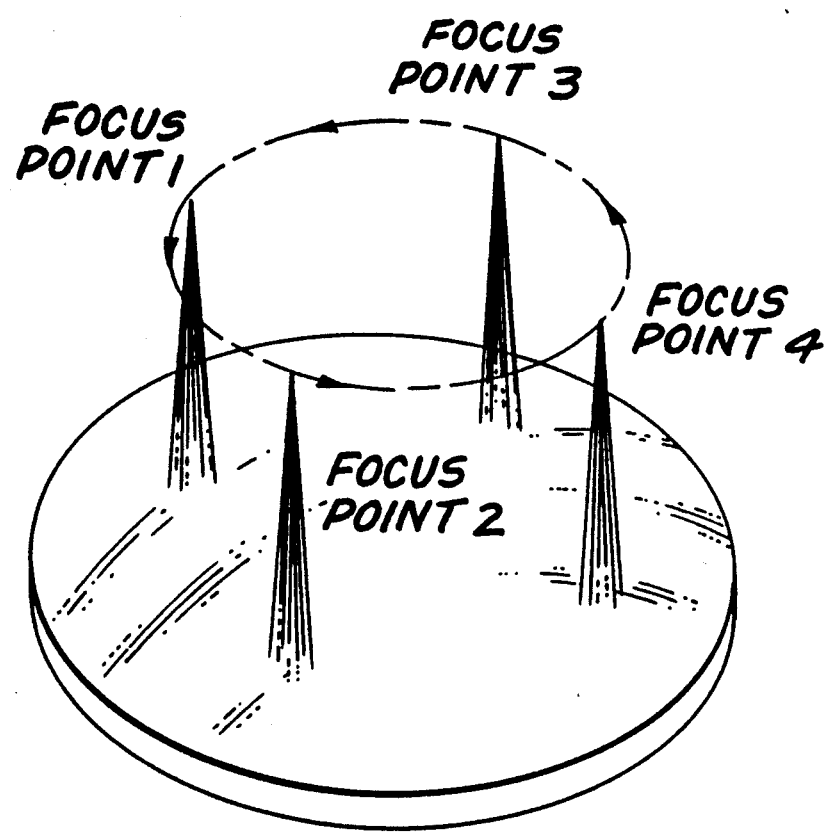

As illustrated in FIG. 9H, the beam output by lens 812 includes four focus points identified as FOCUS POINT 1, FOCUS POINT 2, FOCUS POINT 3 and FOCUS POINT 4. When positioned on a workpiece, the rotation stage causes these focus points to rotate to complete a materials processing operation.

In operation, and utilizing two-split lens 808, a diverging beam 850 is output from optical fiber 474. Diverging beam 850 is intercepted by first collimating lens 802 and forms a first collimated beam 852. First collimated beam 852 is intercepted by lens 804 which forms a diverging beam 854 which diverges from axis 810. Diverging beam 854 is intercepted by lens 806 which forms a second collimated beam 856. Second collimated beam 856 then is intercepted by split lens 808 which then forms beams 858a and 858b. Lens 808 is rotatable about axis 810, and as lens 808 rotates, beams 858a and 858b also rotate. This rotary movement facilitates completion of a materials processing operation. Further, the separation of beams 858a and 858b can be selected by adjusting distance $d_5$ between lenses 806 and 808.

Another output coupler 900 having an L-shape is illustrated in FIG. 10A. An optical fiber 902 is connected to coupler 900, and an output beam 904 is shown being emitted from the coupler. The specific construction of the coupler 900 is substantially similar to the construction of coupler 300 except that coupler 900 is L-shaped. A lens system which may be utilized in coupler 900 is illustrated in FIG. 10B. Specifically, the lens system includes a first collimating lens 906 and a plano-concave lens 908 aligned with lens 906. The second collimating lens 910 is aligned with lens 908 and a beam shaping unit 912 is aligned with second collimating lens 910. Beam shaping unit 912 shown as a block may comprise many different lenses or combination of lenses, such as lenses 376 and 382 shown in FIG. 3A, lens 508 of FIG. 6A, lens 608 of FIG. 7A, lens 708 of FIG. 8A, or lenses 806, 808, 810, 812 of FIGS. 9A-D. The selection of lenses will depend upon the particular operation to be performed. The lenses are mounted in the coupler in the same way as the lenses are mounted in the couplers hereinbefore described.

A mirror 914 is aligned with beam shaping unit 912. Mirror 914 generally is coated with a dielectric material. Since the reflectivity of that coating decreases as the beam incident angle deviates from the prescribed angle, a small portion of the laser beam can be transmitted by the front surface and then reflected from the back surface. All ghost images resulting from back surface reflection do not adversely affect the practice of the present invention, however, it is desirable to minimize their presence. One way to minimize back surface reflections is to coat the back surface of the mirror with an antireflection coating selected according to the laser beam wavelength to reduce reflection of a portion of the beam transmitted by the front surface. It is also noted that the present invention may be successfully practiced wherein the back surface only of each mirror is coated with the reflective dielectric material and not the front surface. It is further noted that the practice of the present invention is not limited to the use of a coating which provides a maximum reflectivity at a prescribed angle of 45°. The prescribed angle of 45° is provided from the preferred mounting of the mirror in the embodiment illustrated and described hereinabove. Each of the lenses 906, 908, and 910 and beam shaping unit 912 and mirror 914 are all aligned along axis 918.

In operation, a beam 950 output from optical fiber 902 converges from axis 918 and is intercepted by first collimating lens 906. A first collimating beam 952 is transmitted from lens 906 to lens 908. Lens 908 causes a diverging beam 954 to be created and diverging beam 954 is intercepted by second collimating lens 910. A second collimated beam 956 is output from lens 910 and intercepted by beam shaping unit 912. A beam 958 output from beam shaping unit 912 is intercepted by mirror 914. Mirror 914 directs beam 960 towards focus lens 916, and focus lens 916 focuses beam 904 on a workpiece.

FIG. 10C illustrates substantially the same system illustrated in FIG. 10B, however, in FIG. 10C, beam shaping unit 912 is positioned after mirror 914. Therefore, beam 962 reflected from mirror 914 is shaped by the beam shaping unit. A beam 964 output by beam shaping unit 912 is intercepted by focus lens 916 and a beam 966 is focused onto a workpiece.

Another lens apparatus 1000, which may be utilized in combination with coupler 300, is illustrated in FIG. 11. Specifically, optical fiber 1002 is aligned with the first collimating lens 1004. A plano-concave lens 1006 is aligned with lens 1004 and a second collimating lens 1008 is aligned with lens 1006. A focus lens 1010 is aligned with collimating lens 1008. Optical fiber 1002 and lenses 1004, 1006, 1008, and 1010 each are aligned along axis 1012.

Lens 1010 is mounted in an x-y translator (not shown). Specifically, in order to provide two degrees of freedom, i.e. movement along both the x and the y axis as shown in FIG. 11, a commercially available x-y translator such as a Melles Groit Positioner available from Melles Groit, Irvine, Calif., 92714, may be utilized. Many other commercially available translators which provide x-y translation may be utilized.

In operation, a diverging beam 1050 output from optical fiber 1002 is intercepted by first collimating lens 1004. A first collimated beam 1052 is output by lens 1004 and intercepted by plano-concave lens 1006. A diverging beam 1054 is output from lens 1006 and intercepted by second collimating lens 1008. A second collimating beam 1056 is output from lens 1008 and intercepted by focus lens 1010. A focused beam 1058 is output by a lens 1010. As lens 1010 is moved along the x and/or y axis, the focused spot of beam 1058 moves along the surface of the workpiece.

Figure 12C:
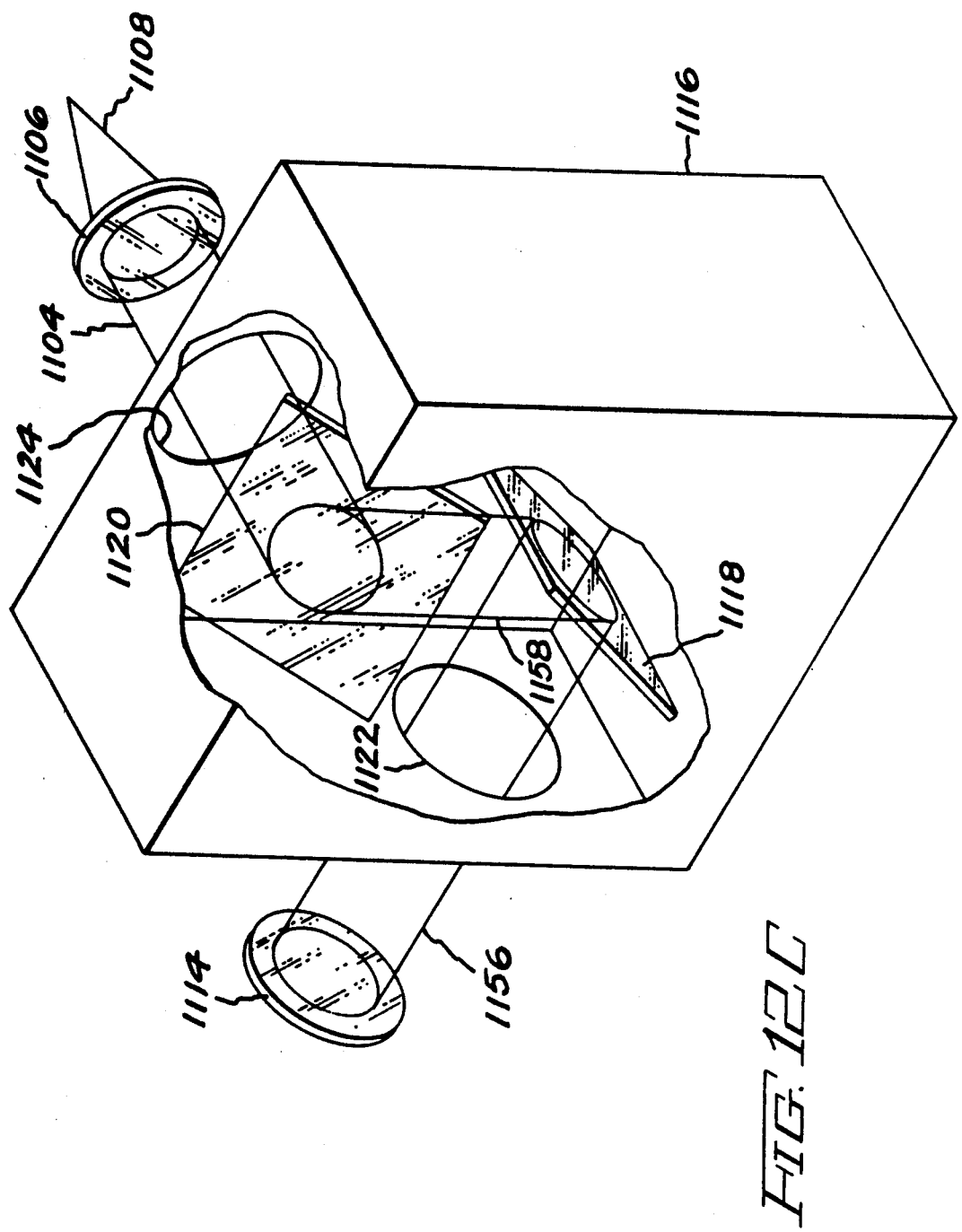

Still yet another coupler 1100 is illustrated in FIG. 12A. Coupler 1100 is connected to an optical fiber 1102 and a beam 1104 is output from the coupler. Focus lens 1106 intercepts beam 1104 and focuses a beam 1108 onto a workpiece. Note that focusing lens 1106 could actually be within coupler 1100 but is shown outside the coupler for illustrative purposes. A lens system which may be utilized in coupler 1100 is illustrated in FIG. 12B and includes a first collimating lens 1110 aligned with optical fiber 1102. A plano-concave lens 1112 is aligned with lens 1110 and a second collimating lens 1114 is aligned with lens 1112. An x-y galvanometer 1116 is aligned with lens 1114. Galvanometer 1116 may be substantially similar to the galvanometer disclosed in commonly assigned U.S. Pat. No. 4,838,631 entitled "Laser Beam Directing System", the entire specification being incorporated, in its entirety, herein by reference. Galvanometer 1116 is further partially illustrated in FIG. 12C and includes mirrors 1118 and 1120. Galvanometer 1116 also includes an opening 1122 formed therein to allow a beam to enter into the galvanometer and an opening 1124 to allow a beam to be emitted from the galvanometer. Specific details with regard to the galvanometer are further described in U.S. Pat. No. 4,838,631.

In operation, a diverging beam 1150 output by optical fiber 1102 is intercepted by first collimating lens 1110. A first collimated beam 1152 is output by lens 1110 and intercepted by plano-concave lens 1112. A diverging beam 1154 is output by lens 1112 and intercepted by second collimating lens 1114. A second collimated beam 1156 is output by lens 1114 and intercepted by mirror 1118 of galvanometer 1116. A beam 1158 is reflected by mirror 1118 and intercepted by mirror 1120. Beam 1104 is deflected from mirror 1120, intercepted by focus lens 1116, and a beam 1108 is focused onto a workpiece by the focusing lens.

While the present invention has been described with respect to specific embodiments, many modifications, variations, substitutions, and equivalents will be apparent to those skilled in the art. Accordingly, the invention is to be considered as limited only by the spirit and scope of appended claims.

What is claimed is:

1. A coupler apparatus for supporting an output end of an optical fiber, said coupler apparatus comprising:
   first lens means for collimating as a first collimated beam portion a high power laser beam emitted from the output end of the fiber;
   second lens means for expanding the first collimated beam portion into a second collimated beam portion having a larger diameter than the first collimated beam portion;
   third lens means for shaping the second collimated beam portion into a shaped materials processing beam portion; and
   fourth lens means for focusing onto a surface the shaped materials processing beam portion.

2. A coupler apparatus in accordance with claim 1 wherein said third lens means comprises:
   a diverging axicon mounted to intercept the second collimated beam portion and provide an annulus-shaped diverging beam portion; and
   a converging axicon mounted to intercept the annulus-shaped diverging beam portion and provide a substantially uniform annulus-shaped beam, said diverging axicon and said converging axicon being separated by a first separation distance.

3. A coupler apparatus in accordance with claim 2 wherein said first separation distance is adjustable.

4. A coupler apparatus in accordance with claim 3 wherein said converging axicon is mounted to a linear translator.

5. A coupler apparatus in accordance with claim 4 wherein operation of said linear translator is computer controlled.

6. A coupler apparatus in accordance with claim 1 wherein said third lens means comprises a diverging bi-prism mounted to intercept the second collimated beam portion and provide split diverging beams, said diverging bi-prism and fourth lens means being separated by a second separation distance.

7. A coupler apparatus in accordance with claim 6 wherein said second separation distance is adjustable.

8. A coupler apparatus in accordance with claim 7 wherein said diverging bi-prism is mounted to a linear translator.

9. A coupler apparatus in accordance with claim 7 wherein said diverging bi-prism is mounted to a rotation stage.

10. A coupler apparatus in accordance with claim 9 wherein said rotation stage is mounted to a linear translator and operation of said linear translator and said rotation stage is computer controlled.

11. A coupler apparatus in accordance with claim 1 wherein said third lens means comprises a converging bi-prism mounted to intercept the second collimated beam portion and provide split converging beams, said converging bi-prism and fourth lens means being separated by a third separation distance.

12. A coupler apparatus in accordance with claim 11 wherein said third separation distance is adjustable.

13. A coupler apparatus in accordance with claim 12 wherein said converging bi-prism is mounted to a linear translator.

14. A coupler apparatus in accordance with claim 12 wherein said converging bi-prism is mounted to a rotation stage.

15. A coupler apparatus in accordance with claim 14 wherein said rotation stage is mounted to a linear translator and operation of said linear translator and said rotation stage is computer controlled.

16. A coupler apparatus in accordance with claim 1 wherein said third lens means comprises a wedge prism mounted to intercept the second collimated beam portion and provide a diverging beam, said wedge prism and fourth lens means being separated by a fourth separation distance.

17. A coupler apparatus in accordance with claim 16 wherein said fourth separation distance is adjustable.

18. A coupler apparatus in accordance with claim 17 wherein said wedge prism is mounted to a linear translator.

19. A coupler apparatus in accordance with claim 17 wherein said wedge prism is mounted to a rotation stage.

20. A coupler apparatus in accordance with claim 19 wherein said rotation stage is mounted to a linear translator and operation of said linear translator and said rotation stage is computer controlled.

21. A coupler apparatus in accordance with claim 1 wherein said third lens means comprises a split lens mounted to intercept the second collimated beam portion and prove a split beam, said split lens and said second lens means being separated by a fifth separation distance.

22. A coupler apparatus in accordance with claim 21 wherein said split lens comprises two split lenses.

23. A coupler apparatus in accordance with claim 21 wherein said split lens comprises three split lenses.

24. A coupler apparatus in accordance with claim 21 wherein said split lens comprises four split lenses.

25. A coupler apparatus in accordance with claim 21 wherein said fifth separation distance is adjustable.

26. A coupler apparatus in accordance with claim 25 wherein said split lens is mounted to a linear translator.

27. A coupler apparatus in accordance with claim 25 wherein said split lens is mounted to a rotation stage.

28. A coupler apparatus in accordance with claim 27 wherein said rotation stage is mounted to a linear translator and operation of said linear translator and said rotation stage is computer controlled.

29. A coupler apparatus in accordance with claim 1 wherein said apparatus is substantially L-shaped and a mirror is disposed between said third lens means and said fourth lens means.

30. A coupler apparatus in accordance with claim 1 wherein said apparatus is substantially L-shaped and a mirror is disposed between said second lens means and said third lens means.

31. A coupler apparatus in accordance with claim 1 wherein said third and fourth lens means comprise a focus lens mounted to an x-y translator.

32. A coupler apparatus in accordance with claim 1 wherein said third lens means comprises an x-y galvanometer.

33. A coupler apparatus for supporting an output end of an optical fiber, said coupler apparatus comprising:

a first plano-convex lens for intercepting a first diverging beam portion emitted from the output end of the fiber and for providing a first collimated beam portion;

a plano-concave lens for intercepting the first collimated beam portion and for providing a second diverging beam portion;

a second plano-convex lens for intercepting the second diverging beam portion and for providing a second collimated beam portion;

a diverging axicon for intercepting the second collimated beam portion and for providing a diverging annulus-shaped beam portion;

a converging axicon for intercepting the diverging annulus-shaped beam portion and for providing a substantially uniform annulus-shaped beam portion; and a third plano-convex lens for intercepting the substantially uniform annulus-shaped beam portion and for focusing a beam portion onto a workpiece.

34. A coupler apparatus in accordance with claim 33 wherein said converging axicon is mounted on a linear translator and a separation distance between said diverging axicon and said converging axicon is adjustable.

35. A coupler apparatus in accordance with claim 34 wherein said linear translator is computer controlled.

36. A coupler apparatus in accordance with claim 33 further comprising:

a nozzle mounted to an output end of said coupler, said nozzle including at least one flow path for directing a gas towards an output end of said nozzle.

37. A coupler apparatus for supporting an output end of an optical fiber, said coupler apparatus comprising:

a first plano-convex lens for intercepting a first diverging beam portion emitted from the output end of the fiber and for providing a first collimated beam portion;

a plano-concave lens for intercepting the first collimated beam portion and for providing a second diverging beam portion;

a second plano-convex lens for intercepting the second diverging beam portion and for providing a second collimated beam portion;

a diverging bi-prism for intercepting the second collimated beam portion and for providing two split beams; and a third plano-convex lens for intercepting the split beams and for focusing beam portions onto workpiece.

38. A coupler apparatus in accordance with claim 37 wherein said diverging bi-prism is mounted in a rotation stage, said rotation stage, said rotation stage being mounted in a linear translator.

39. A coupler apparatus in accordance with claim 38 wherein said rotation stage and said linear translator are computer controlled.

40. A coupler apparatus in accordance with claim 37 further comprising:

a nozzle mounted to an output end of said coupler, said nozzle including at least one flow path for directing a gas towards an output end of said nozzle.

* * * * *